(12) United States Patent
Tibbits et al.

(10) Patent No.: US 11,155,025 B2
(45) Date of Patent: Oct. 26, 2021

(54) METHODS FOR ADDITIVE MANUFACTURING OF AN OBJECT

(71) Applicants: Massachusetts Institute of Technology, Cambridge, MA (US); Stratasys Ltd., Rehovot (IL)

(72) Inventors: Skylar J. E. Tibbits, Boston, MA (US); Daniel Dikovsky, Rehovot (IL); Shai Hirsch, Rehovot (IL)

(73) Assignees: MASSACHUSETTS INSTITUTE OF TECHNOLOGY, Cambridge, MA (US); STRATASYS LTD., Rehovot (IL)

(*) Notice: Subject to any disclaimer, the term of this patent is extended or adjusted under 35 U.S.C. 154(b) by 0 days.

(21) Appl. No.: 16/905,744

(22) Filed: Jun. 18, 2020

(65) Prior Publication Data

US 2020/0316847 A1 Oct. 8, 2020

Related U.S. Application Data

(62) Division of application No. 14/189,819, filed on Feb. 25, 2014, now abandoned.
(Continued)

(51) Int. Cl.
*B29C 41/22* (2006.01)
*B29C 71/02* (2006.01)
(Continued)

(52) U.S. Cl.
CPC .......... *B29C 61/003* (2013.01); *B29C 61/02* (2013.01); *B29C 61/04* (2013.01); *B29C 64/106* (2017.08);
(Continued)

(58) Field of Classification Search
CPC ....... B29C 41/22; B29C 61/003; B29C 61/02; B29C 61/04; B29C 64/106; B29C 64/112;
(Continued)

(56) References Cited

U.S. PATENT DOCUMENTS 529,719 A 11/1894 Eils
2,104,742 A 1/1938 Fleischer
(Continued)

FOREIGN PATENT DOCUMENTS

AT 006 615 U1 1/2004
DE 20 2008 015 143 U1 3/2009
(Continued)

OTHER PUBLICATIONS

International Search Report and Written Opinion for International Application No. PCT/US2014/018373, titled: "Object of Additive Manufacture With Encoded Predicted Shape Change," dated Sep. 3, 2014.
(Continued)

*Primary Examiner* — Leo B Tentoni
(74) *Attorney, Agent, or Firm* — Hamilton, Brook, Smith & Reynolds, P.C.

(57) ABSTRACT

The combination of 3D printing technology plus the additional dimension of transformation over time of the printed object is referred to herein as 4D printing technology. Particular arrangements of the additive manufacturing material(s) used in the 3D printing process can create a printed 3D object that transforms over time from a first, printed shape to a second, predetermined shape.

23 Claims, 24 Drawing Sheets

Related U.S. Application Data

(60) Provisional application No. 61/930,521, filed on Jan. 23, 2014, provisional application No. 61/912,056, filed on Dec. 5, 2013.

(51) Int. Cl.

| | | |
|---|---|---|
| *B29C 71/04* | (2006.01) | |
| *B29C 61/00* | (2006.01) | |
| *B29C 69/02* | (2006.01) | |
| *C08F 220/20* | (2006.01) | |
| *B29C 64/386* | (2017.01) | |
| *B29C 61/02* | (2006.01) | |
| *B29C 71/00* | (2006.01) | |
| *B29C 64/112* | (2017.01) | |
| *B29C 61/04* | (2006.01) | |
| *B29C 64/106* | (2017.01) | |
| *B29K 33/04* | (2006.01) | |
| *B29K 71/00* | (2006.01) | |
| *B33Y 10/00* | (2015.01) | |
| *B33Y 50/02* | (2015.01) | |
| *B33Y 70/00* | (2020.01) | |
| *B33Y 80/00* | (2015.01) | |
| *B29K 105/02* | (2006.01) | |
| *B29L 31/52* | (2006.01) | |
| *B29K 33/00* | (2006.01) | |
| *B29L 31/22* | (2006.01) | |

(52) U.S. Cl.
CPC .......... *B29C 64/112* (2017.08); *B29C 64/386* (2017.08); *B29C 69/025* (2013.01); *B29C 71/0009* (2013.01); *C08F 220/20* (2013.01); *B29K 2033/04* (2013.01); *B29K 2033/08* (2013.01); *B29K 2071/02* (2013.01); *B29K 2105/02* (2013.01); *B29K 2995/0049* (2013.01); *B29L 2031/22* (2013.01); *B29L 2031/529* (2013.01); *B29L 2031/5281* (2013.01); *B33Y 10/00* (2014.12); *B33Y 50/02* (2014.12); *B33Y 70/00* (2014.12); *B33Y 80/00* (2014.12); *Y10T 403/32* (2015.01); *Y10T 403/32606* (2015.01); *Y10T 403/32975* (2015.01); *Y10T 428/31913* (2015.04)

(58) Field of Classification Search
CPC ... B29C 69/025; B29C 71/0009; B29C 71/02; B29C 71/04; B29K 2033/08; B29K 2071/02; B29K 2105/02; B29K 2995/0049; B29L 2031/22; B29L 2031/5281; B29L 2031/529; B33Y 10/00; B33Y 40/20; B33Y 70/10; B33Y 80/00
USPC .......... 264/230, 232, 234, 255, 308, 331.18, 264/342 R, 343, 480
See application file for complete search history.

(56) References Cited

U.S. PATENT DOCUMENTS

| | | |
|---|---|---|
| 2,414,716 A | 1/1947 | Carson |
| 2,490,586 A | 12/1949 | Embree |
| 2,680,501 A | 6/1954 | Cunningham |
| 2,765,159 A | 10/1956 | Garofalo |
| 3,019,552 A | 2/1962 | Schleich |
| 3,081,514 A | 3/1963 | Griswold |
| 3,125,195 A | 3/1964 | Moore |
| 3,389,451 A | 6/1968 | Speca et al. |
| 3,391,048 A | 7/1968 | Dyer et al. |
| 3,468,748 A | 9/1969 | Bassett |
| 4,107,870 A | 8/1978 | Ausnit |
| 4,205,152 A | 5/1980 | Mizuguchi et al. |
| 4,290,170 A | 9/1981 | Brookstein et al. |
| 4,575,330 A | 3/1986 | Hull |
| 4,674,580 A | 6/1987 | Schuh |
| 4,735,418 A | 4/1988 | Engel |
| 4,777,859 A | 10/1988 | Plummer, Jr. |
| 4,978,564 A | 12/1990 | Douglas |
| 5,281,181 A | 1/1994 | McCollum |
| 5,853,313 A | 12/1998 | Zheng |
| 5,928,803 A | 7/1999 | Yasuda |
| 6,012,494 A | 1/2000 | Balazs |
| 6,175,422 B1 | 1/2001 | Penn et al. |
| 6,264,199 B1 | 7/2001 | Schaedel |
| 6,569,373 B2 | 5/2003 | Napadensky |
| 7,007,370 B2 | 3/2006 | Gracias et al. |
| 7,160,612 B2 | 1/2007 | Magill et al. |
| 7,216,678 B2 | 5/2007 | Baer |
| 7,225,045 B2 | 5/2007 | Gothait et al. |
| 7,300,619 B2 | 11/2007 | Napadensky et al. |
| 7,500,846 B2 | 3/2009 | Eshed et al. |
| 7,575,807 B1 | 8/2009 | Barvosa-Carter et al. |
| 7,851,122 B2 | 12/2010 | Napadensky |
| 7,862,624 B2 | 1/2011 | Tran |
| 8,082,696 B2 | 12/2011 | Oliver et al. |
| 8,424,249 B2 | 4/2013 | Oliver |
| 8,475,074 B1 | 7/2013 | Henry |
| 8,652,602 B1 | 2/2014 | Dolla |
| 8,992,183 B2 | 3/2015 | Perich et al. |
| 9,079,337 B2 | 7/2015 | Lipton et al. |
| D744,719 S | 12/2015 | Amarasiriwardena |
| 9,487,387 B2 | 11/2016 | MacCurdy et al. |
| 9,723,866 B2 | 8/2017 | Lipson et al. |
| 9,987,907 B1 | 6/2018 | Temchenko |
| 9,993,104 B2 | 6/2018 | Lipton et al. |
| 10,005,235 B2 | 6/2018 | Millar |
| 10,118,339 B2 | 11/2018 | Lipton et al. |
| 10,132,931 B2 | 11/2018 | MacCurdy et al. |
| 10,150,258 B2 | 12/2018 | Feinberg et al. |
| 10,166,726 B2 | 1/2019 | Fripp et al. |
| 10,259,161 B2 | 4/2019 | Lipton et al. |
| 10,513,089 B2 | 12/2019 | Tibbits et al. |
| 10,549,505 B2 | 2/2020 | Tibbits et al. |
| 10,633,772 B2 | 4/2020 | Tibbits et al. |
| 2002/0016386 A1* | 2/2002 | Napadensky ......... B29C 64/112 523/201 |
| 2002/0043950 A1 | 4/2002 | Yim et al. |
| 2002/0104973 A1 | 8/2002 | Kerekes |
| 2002/0116847 A1 | 8/2002 | Yen |
| 2002/0125790 A1 | 9/2002 | Horning et al. |
| 2003/0090034 A1 | 5/2003 | Mülhaupt et al. |
| 2003/0177749 A1 | 9/2003 | Jen |
| 2004/0134250 A1* | 7/2004 | Durney ................ B21D 11/08 72/324 |
| 2004/0197519 A1 | 10/2004 | Elzey et al. |
| 2004/0244309 A1 | 12/2004 | Raue |
| 2005/0227560 A1 | 10/2005 | Allred, III |
| 2006/0016507 A1 | 1/2006 | Baer |
| 2006/0184231 A1 | 8/2006 | Rucker |
| 2006/0186700 A1 | 8/2006 | Browne et al. |
| 2007/0036964 A1 | 2/2007 | Rosenberger et al. |
| 2007/0106173 A1 | 5/2007 | Korotko et al. |
| 2007/0134486 A1 | 6/2007 | Bansal et al. |
| 2007/0163305 A1 | 7/2007 | Baer et al. |
| 2008/0027199 A1 | 1/2008 | Mazurek et al. |
| 2008/0057809 A1 | 3/2008 | Rock |
| 2008/0066393 A1 | 3/2008 | Sorensen |
| 2008/0075850 A1 | 3/2008 | Rock |
| 2008/0075930 A1 | 3/2008 | Kornbluh et al. |
| 2008/0105324 A1 | 5/2008 | Baer |
| 2008/0109103 A1 | 5/2008 | Gershenfeld et al. |
| 2008/0234458 A1 | 9/2008 | West |
| 2008/0269420 A1 | 10/2008 | Tong et al. |
| 2008/0282527 A1 | 11/2008 | Beck et al. |
| 2009/0176054 A1 | 7/2009 | Laib et al. |
| 2009/0218307 A1 | 9/2009 | Davies et al. |
| 2009/0233067 A1 | 9/2009 | Doomheim et al. |
| 2010/0168439 A1 | 7/2010 | Olson |
| 2010/0191360 A1 | 7/2010 | Napadensky et al. |
| 2010/0199582 A1 | 8/2010 | Oliver et al. |

(56) References Cited

U.S. PATENT DOCUMENTS

| | | | |
|---|---|---|---|
| 2011/0082538 A1* | 4/2011 | Dahlgren | A61B 17/00234 623/2.11 |
| 2011/0285052 A1 | 11/2011 | Wigand et al. | |
| 2012/0037263 A1 | 2/2012 | Malloy | |
| 2012/0068378 A1 | 3/2012 | Swanson et al. | |
| 2012/0091744 A1 | 4/2012 | McKnight et al. | |
| 2012/0094060 A1 | 4/2012 | Gershenfeld et al. | |
| 2012/0133080 A1 | 5/2012 | Moussa et al. | |
| 2012/0137611 A1 | 6/2012 | Oliver | |
| 2012/0308805 A1 | 12/2012 | Sella | |
| 2013/0040091 A1 | 2/2013 | Dikovsky et al. | |
| 2013/0073068 A1 | 3/2013 | Napadensky | |
| 2013/0078415 A1 | 3/2013 | Rock | |
| 2013/0089642 A1 | 4/2013 | Lipson et al. | |
| 2013/0243997 A1 | 9/2013 | Spadaccini et al. | |
| 2013/0246018 A1 | 9/2013 | Spadaccini et al. | |
| 2013/0249981 A1 | 9/2013 | Nakagawa | |
| 2014/0013962 A1 | 1/2014 | Lipton et al. | |
| 2014/0037873 A1 | 2/2014 | Cheung et al. | |
| 2014/0050811 A1 | 2/2014 | Lipton et al. | |
| 2014/0059734 A1 | 3/2014 | Toronjo | |
| 2014/0101816 A1 | 4/2014 | Toronjo | |
| 2014/0265032 A1 | 9/2014 | Teicher et al. | |
| 2014/0311187 A1 | 10/2014 | Amarasiriwardena et al. | |
| 2015/0014881 A1 | 1/2015 | Elsey | |
| 2015/0017411 A1 | 1/2015 | Wilkie et al. | |
| 2015/0075033 A1 | 3/2015 | Cross et al. | |
| 2015/0158244 A1 | 6/2015 | Tibbits et al. | |
| 2015/0174885 A1 | 6/2015 | Khan | |
| 2016/0009029 A1 | 1/2016 | Cohen et al. | |
| 2016/0023403 A1 | 1/2016 | Ramos | |
| 2016/0067918 A1 | 3/2016 | Millar | |
| 2016/0101594 A1 | 4/2016 | Tibbits et al. | |
| 2016/0121546 A1 | 5/2016 | Yao et al. | |
| 2016/0208476 A1 | 7/2016 | Wadley et al. | |
| 2016/0214321 A1 | 7/2016 | Tow et al. | |
| 2016/0317939 A1 | 11/2016 | Fernandez et al. | |
| 2016/0318255 A1 | 11/2016 | Ou et al. | |
| 2016/0340814 A1 | 11/2016 | Ridley et al. | |
| 2016/0340826 A1 | 11/2016 | Tibbits et al. | |
| 2017/0042034 A1 | 2/2017 | MacCurdy et al. | |
| 2017/0057704 A1 | 3/2017 | Li et al. | |
| 2017/0106594 A1 | 4/2017 | Gardiner | |
| 2017/0120535 A1 | 5/2017 | MacCurdy et al. | |
| 2017/0145694 A1 | 5/2017 | Carney et al. | |
| 2017/0182723 A1 | 6/2017 | Calisch et al. | |
| 2017/0326785 A1 | 11/2017 | MacCurdy et al. | |
| 2018/0021140 A1 | 1/2018 | Angellini et al. | |
| 2018/0156204 A1 | 6/2018 | Lipton | |
| 2018/0187337 A1 | 7/2018 | Iseki | |
| 2018/0194106 A1 | 7/2018 | Tibbits et al. | |
| 2018/0195213 A1 | 7/2018 | Tibbits et al. | |
| 2018/0281295 A1 | 10/2018 | Tibbits et al. | |
| 2018/0291535 A1 | 10/2018 | Ridley et al. | |
| 2018/0311833 A1 | 11/2018 | Lipton et al. | |
| 2019/0039309 A1 | 2/2019 | Busbee et al. | |
| 2019/0084282 A1 | 3/2019 | Prasad et al. | |
| 2019/0291350 A1 | 9/2019 | Feinberg et al. | |
| 2020/0016833 A1 | 1/2020 | Yuwaki et al. | |

FOREIGN PATENT DOCUMENTS

| | | |
|---|---|---|
| DE | 20 2009 000 527 U1 | 4/2009 |
| EP | 1274559 B1 | 1/2003 |
| FR | 1331581 A | 7/1963 |
| FR | 1243060 A | 10/1967 |
| FR | 2479923 | 4/1980 |
| FR | 2583334 A1 | 12/1986 |
| FR | 2956590 | 8/2011 |
| GB | 2 455 167 A | 6/2009 |
| JP | H07 42024 A | 2/1995 |
| WO | WO 00/69747 A1 | 11/2000 |
| WO | WO 01/78968 A1 | 10/2001 |
| WO | WO 2014/014892 A2 | 1/2014 |
| WO | WO 2014/025089 A1 | 2/2014 |
| WO | WO 2015/017421 A2 | 2/2015 |
| WO | WO 2015/084422 A1 | 6/2015 |
| WO | WO 2015/139095 A1 | 9/2015 |
| WO | WO 2016/057853 A1 | 4/2016 |
| WO | WO 2017/079475 A1 | 5/2017 |
| WO | WO 2017/081040 A1 | 5/2018 |
| WO | WO 2018/088965 A1 | 5/2018 |
| WO | WO 2018/187514 A1 | 10/2018 |

OTHER PUBLICATIONS

International Preliminary Report on Patentability for International Application No. PCT/US2014/018373, titled: "Object of Additive Manufacture With Encoded Predicted Shape Change," dated Jun. 7, 2016.

3D Printing (Photolithography), MRSEC Education Group, University of Wisconsin-Madison. Accesed: Nov. 23, 2016.

A Brief History of 3D Printing, T. Rowe Price, 1 page (2012).

About Additive Manufacturing, Additive Manufacturing Research Group, Loughborough University, copyright 2016, http://www.lboro.ac.uk!research/amrg/about/the7categoriesofadditivemanufacturing/.

Ackerman, E. "This self-poofing fabric transforms from t-shirt to parka," IEEE Spectrum, Mar. 18, 2017.

Advanced Functional Fabrics of America (AFFOA) Project Call 1.0 Full Proposal, Jun. 2017.

Aguilera, E., et al., "3D Printing of Electro Mechanical Systems," 24th International SFF Symposium—An Additive Manufacturing Conference, SFF 2013, pp. 950-961 (2013).

Ahn, J-H., et al., "Heterogeneous Three-Dimensional Electronics by Use of Printed Semiconductor Nanomaterial," Science, 314: 1754-1757 (2006).

Akhavan, V., et al., "Reacting Thick-Film Copper Conductive Inks with Photonic Curing," 5 pages (2013).

Altan, T., et al., "Manufacturing of Dies and Molds," 19 pages (2001).

Anatomy & Physiology (Open + Free), Unit 5: Muscular System, Module 16, "Skeletal Muscle Organ Anatomy" (Mar. 18, 2018).

Anatomy & Physiology (Open + Free), Unit 6: Muscular System, Module 17, "Muscle Fiber Organization" (Mar. 18, 2018).

Armon, Shahaf et al., "Geometry and Mechanics in the Opening of Chiral Seed Pods," Science, 333: 1726-1730 (2011).

Auxetic 3D honeycomb, Retrieved from the Internet at: https://youtu.be/2WkFS1wYWLA>, 1 page (2015).

Bailey, S.A., et al., "Biomimetic Robotic Mechanisms Via Shape Deposition Manufacturing," pp. 1-8 (2000).

Bartlett, Nicholas W., et al., "A 3D-printed, functionally graded soft robot powered by combustion," Science, 349(6244): 161-166 (Jul. 10, 2015).

Bendsoe, M.P. and Kikuchi, N., "Generating Optimal Topologies in Structural Desing Using a Homogenization Method," Comp. Meth. App. Mech. Eng., 71: 197-224 (1988).

Berman, B., "3-D Printing: The New Industrial Revolution," Business Horizons, 55: 155-162 (2012).

Bhargava, K. et al., "Discrete Elements for 3D Microfluidics," PNAS, 111(42): 15013-15018 (2014).

Bicchi, A. and Tonietti, G., "Fast and 'Soft-Arm' Tactics," IEEE Robotics & Automation Magazine, 22-33 (2004).

Blakely, Andrew M., "Bio-Pick, Place, and Perfuse: A New Instrument for 3D Tissue Engineering," Tissue Engineering: Part C, vol. 00, No. 00, pp. 1-10 (2015).

Borghino, D., "Voxel8 Paves the Way for 3D-Printed Electronics," Accessed at www.gizmag.com pp. 1-6 (Jan. 14, 2015).

Bouten, S., "Transformable Structures and their Architectural Application," Universiteit Gent, Department of Structural Engineering, 196 pages (2015).

Bruyas, A., et al., "Combining Multi-Material Rapid Prototyping and Pseudo-Rigid Body Modeling for a New Compliant Mechanism," 2014 IEEE International Conference on Robotics & Automation (ICRA), pp. 3390-3396 (2014).

Cali, J., et al., "3D-Printing of Non-Assembly, Articulated Models," ACM Trans. Graph., Article No. 130, 31(6): 1-8 (2012).

(56) References Cited

OTHER PUBLICATIONS

Cantatore, E., "Applications of Organic and Printed Electronics, A Technology-Enabled Revolution," Springer Publishers, ISBN No. 978-1-4614-3159-6, pp. 1-187 (2013).
Chandler, David L. Printing off the Paper. MIT News (2011); available at: http://web.mit.edu/newsoffice/2011/3d-printing-0914.html, 4 pages, (last visited: Mar. 3, 2014).
Cheney, N., et al., "Unshackling Evolution," SIGEVOlution, 7(1): 11-23 (2013).
Christenson, K.K., et al., "Direct Printing of Circuit Boards Using Aerosol Jet®," Tech. Prog. Proc., pp. 433-436 (2011).
Church, K., et al., "Commercial Applications and Review for Direct Write Technologies," Mat. Res. Soc. Symp. Proc., 624: 3-8 (2000).
Cityzen smart shirt tracks your health, recharges during washing—https://newatlas.com/cityzen-smart-shirt-sensing-fabric-health-monitoring/30428/ (Feb. 3, 2014).
Clark, Liat, "How hair gel enables freeform 3D printing with an undo function," Retrieved from the Internet at: https://www.wired.co.uk/article/undo-3d-printing, Retrieved from the Internet on: Mar. 22, 2019, 11 pages.
Comber, D.B., et al., "Design, Additive Manufacture, and Control of a Pneumatic MR-Compatible Needle Driver," IEEE Trans. Rob., 1-12 (2015).
Coros, S., et al., "Computational Design of Mechanical Characters," 12 pages (2013).
De Laurentis, K.J., et al., "Procedure for Rapid Fabrication of Non-Assembly Mechanisms with Embedded Components," Procccdsing of DETC'02: ASME 2002 Design Engineering Technical Conferences and Computers and Information in Engineering Conference, pp. 1-7 (2002).
Derby, B., "Inkjet Printing of Functional and Structural Materials: Fluid Property Requirements, Feature Stability, and Resolution," Annu. Rev. Mater. Res., 40: 395-414 (2010).
Dimas, L.S., et al., "Tough Composites Inspired by Mineralized Natural Materials: Computation, 3D Printing, and Testing," Adv. Funct. Mater., 23(36): 1-10 (2013).
Doubrovski, E.L., et al., "Voxel-Based Fabrication Through Material Property Mapping: A Design Method for Bitmap Printing," Computer-Aided Design, 60: 3-13 (2015).
Dutta, D., et al., "Layered Manufacturing: Current Status and Future Trends," Trans. ASME, 1:6071 (Mar. 2001).
Eaton, M., et al., "The Modelling, Prediction, and Experimental Evaluation of Gear Pump Meshing Pressures with Particular Reference to Aero-Engine Fuel Pumps," Proc. IMechE, 220 (Part 1): 365-379 (2006).
Espalin, D., et al., "3D Printing Multifunctionality: Structures with Elements," Int. J. Adv. Manuf. Technol., 72: 963-978 (2014).
Fairs, Marcus, Dezeen: "SCI-Arc student develops freeform 3D printing with "undo" function," Retrieved from the Internet at: https://www.dezeen.com/2013/07/23/sci-arc-student-develops-freeform-3d-printing-with-undo-function/, Retrieved from the Internet on: Oct. 8, 2019, 16 pages.
Farahi, B., "Caress of the Gaze: A Gaze Actuated 3D Printed Body Architecture," Oct. 2016, 10 pages (2016).
Ferry, P.W., et al., "A Review on Stereolithography and Its Applications in Biomedical Engineering," Biomat., 31: 6121-6130 (2010).
Fuller, S.B., et al., "Ink-Jet Printed Nanoparticle Microelectromechanical Systems," J. Microelec. Sys., 11(1): 54-60 (2002).
Gatt, R., et al., "On the behaviour of bi-material strips when subjected to changes in external hydrostatic pressure," Scripta Materialia, 60: 65-67 (2009).
Ge, Qi, et al., "Active materials by four-dimension printing," Applied Physics Letters, 103: 131901-131901-5 (2013).
Ge, Q. et al., "Active origami by 4D printing," Smart Materials and Structures, 23(9): 1-15 (2014).
Ghiuzan, "Deployable Structures," Retrieved from the Internet at: https://youtu.be/E-IqvGAfQ68>, 1 page (2016).
Gong, H., et al., "High Density 3D Printed Microfluidic Valves, Pumps, and Multiplexers, Lab on a Chip" Royal Society of Chemistry, 9 pages (2016).

Grunewald, S., "Nano Dimension Unveils the DragonFly 2020, World's First Desktop Electronic 3D Printer," Downloaded from https://3DPrint.com, The Voice of 3D Printing Technologies, pp. 1-5 (Nov. 18, 2015).
Grzesiak, A., et al., "The Bionic Handling Assistant: A Success Story of Additive Manufacturing," Assemb. Autom., 31(4): 329-333 (2011).
Guan, J. et al. "Self-Folding of Three-Dimensional Hydrogel Microstructures," Journal of Physical Chemistry B, 109:23134-23137 (2005).
Hajash et al., Large-Scale Rapid Liquid Printing, 3D Printing and Additive Manufacturing, vol. 4, No. 3 (2017).
Hanuska et al., Smart Clothing Market Analysis (printed Aug. 20, 2019).
Hawkes et al. Programmable matter by folding, PNAS, vol. 107(28): 12441-12445 (2010).
Hexoskin Smart Shirts—https://www.hexoskin.com/ printed Aug. 20, 2019.
Hiller, J. and Lipson, H., "Automatic Design and Manufacture of Soft Robots," IEEE Trans. Rob., 28(2): 457-466 (2012).
Hiller, J. and Lipson, H., "Methods of Parallel Voxel Manipulation for 3D Digital Printing," pp. 200-211 (2007).
Hiller, J. and Lipson, H., "Tunable Digital Material Properties for 3D Voxel Printers," Rapid Prototyping Journal, 16(4): 241-247 (2009).
Hiller, J.D., et al., "Microbricks for Three-Dimensional Reconfigurable Modular Microsystems," J. Microelec. Sys., 20(5): 1089-1097 (2011).
Huber, C., et al., 3D Print of Polymer Bonded Rare-Earth Magnets, and 3D Magnetic Field Scanning with an End-User 3D Printer, Applied Physics Letters, 109: 162401-1-162401-4 (2016).
Ionov, L., "Soft Microorigami: self-folding polymer films," Soft Matter, 7: 6786 (Published online May 24, 2011).
Janbaz et al., Programming the shape-shifting of flat soft matter: from self-rolling/self-twisting materials to self-folding origami, Materials Horizons, vol. 3, No. 6, pp. 536-547 (2016).
Jeffrey, C., "V-One Conductive Ink Printer Aims to Short-Circuit Electronic Prototyping," accessed on www.gizmag.com pp. 1-6 (Feb. 10, 2015).
Jeong, K-U. et al., "Three-dimensional actuators transformed from the programmed two-dimensional structures via bending, twisting and folding mechanisms," Journal of Materials Chemistry, 21: 6824-6830 (2011).
Jung et al., "Water-responsive shape memory polyurethane block copolymer modified with polyhedral oligomeric silsesquioxane," Journal of Macromolecular Science, Part B, 45: 453-461 (2006).
Kang, H., et al., "Direct Intense Pulsed Light Sintering of Inkjet-Printed Copper Oxide Layers within Six Milliseconds," ACS Appl. Mater. Interfaces, 6:1682-1687 (2014).
Kanthal Thermostatic Bimetal Handbook, Kanthal AB, pp. 1-134 (2008).
Klein, Yael, et al. "Shaping of Elastic Sheets by Prescription of Non-Euclidean Metrics," Science, 315:1116-1120 (2007).
Kolesky, D.B., et al., "3D Bioprinting of Vascularized, Heterogeneous Cell-Laden Tissue Constructs," Adv. Mater., 26:3124-3130 (2014).
Konaković et al. "Beyond developable: computational design and fabrication with auxetic materials," ACM Transactions on Graphics (TOG), vol. 35, Issue 4, Article No. 89 (Jul. 2016).
Kong, Y.L., et al "3D Printed Quantum Dot Light-Emitting Diodes," Nano. Lett., 14:7017-7023 (2014).
Kruth, J.P., et al., "Progress in Additive Manufacturing and Rapid Prototyping," Annals CIRP, 47(2): 525-540 (1998).
Kuehn, T. and Rieffel, J., "Automatically Designing and Printing 3-D Objects with EvoFab 0.2," Artificial Life, 13: 372-378 (2012).
Laschi, C., et al., "Soft Robot Arm Inspired by the Octopus," Adv. Rob., 26: 709-727 (2012).
Li, B., et al., "Robust Direct-Write Dispensing Tool and Solutions for Micro/Meso-Scale Manufacturing and Packaging," ASME Proceedings of the 2007 International Maufacturing Science and Engineering Conference, pp. 1-7 (2007).
Li, X., "Embedded Sensors in Layered Manufacturing," Dissertation submitted to Stanford University, pp. 1-152 (Jun. 2001).

(56) References Cited

OTHER PUBLICATIONS

Lin, H.-T., et al., "GoQBot: A Caterpillar-Inspired Soft-Bodied Rolling Robot," Bioinsp. Biomim., 6: 1-14 (2011).

Lipson, H., "Challenges and Opportunities for Design, Simulation, and Fabrication of Soft Robots," Soft Robotics, 1(1): 21-27 (2014).

Lipson, H., and Kurman, M., "Factory@Home—The Emerging Economy of Personal Manufacturing," One of a series of Occasional Papers in Science and Technology Policy, pp. 1-103 (Dec. 2010).

Lipton, J. et al., "Fab@Home Model 3: A More Robust, Cost Effective and Accessible Open Hardware Fabrication Platform," 125-135 (2012).

Liu, Y., et al., "Self-Folding by Local Light Absorption," screenshots provided, full video available at: http://www.youtube.com/watch?v=NKRWZG67dtQ, pp. 1-10, (Nov. 10, 2011).

Liu, Y., et al., "Self-folding of polymer sheets using local light absorption," Soft Matter 8(6): 1764-1769 (2012).

Louis-Rosenberg, J., "Drowning in Triangle Soup: The Quest for a Better 3-D Printing File Format," XRDS, 22(3): 58-62 (2016).

MacCurdy, R., et al., "Bitblox: Printable Digital Materials for Electromechanical Machines," Int'l J. Robotics Res., 33(10), 1342-1360 (2014).

MacCurdy, R., et al., "Printable Hydraulics: A Method for Fabricating Robots by 3D Co-Printing Solids and Liquids," 2016 IEEE International Conference on Robotics and Automation (ICRA), pp. 1-8 (2016).

MacCurdy, R., et al.. "Printable Programmable Viscoelastic Materials for Robots," IEEE/RSJ International Conference on Intelligent Robots and Systems (IROS), pp. 1-8 (2016).

MacDonald, E., et al., "3D Printing for the Rapid Prototyping of Structural Electronics," IEEE, 2:234-242 (2014).

Macdonald, N.P., et al., "Assessment of Biocompatibility of 3D Printed Photopolymers Using Zebrafish Embryo Toxicity Assays," Royal Society of Chemistry—Lab on a Chip, 16: 291-297 (2016).

Mack, E., "Beyond 3D Printers and the Coming of the Home Electronics Factory," www.gizmag.com, pp. 1-5 (Oct. 22, 2014).

Malone, E., and Lipson, H., "Multi-Material Freeform Fabrication of Active Systems," Proceedings of the 9th Biennial ASME Conference on Engineering Systems Design and Analysis, pp. 1-9, (2008).

Mannoor, M.S., et al., "3D Printed Bionic Ears," Nano. Lett., 13: 2634-2639 (2013).

Mao et al., "3D Printed Reversible Shape Changing Components with Stimuli Responsive Materials," Scientific Reports, 6:247612 (2016).

Mao, Y., et al., "Scientific Reports: Sequential Self-Folding Structures by 3D Printed Digital Shape Memory Polymers," Nature, pp. 1-12 (2015).

Marchese, A.D., et al., "A Recipe for Soft Fluidic Elastomer Robots," Soft Robotics, 2(1): 7-25 (2015).

Mehta, A., et al., "Cogeneration of Mechanical, Electrical, and Software Design for Printable Robots from Structural Specifications," Int. Rob. Sys.: 2892-2897 (2014).

Mehta, A., et al., "Integrated Codesign of Printable Robots," J. Mech. Rob., 7: 1-10 (2015).

Meier et al., "An objective 3D large deformation finite element formulation for geometrically exact curved Kirchhoff rods," Computer Methods in Applied Mechanics and Engineering, Aug. 2014.

Meisel, N.A., et al., "A Procedure for Creating Actuated Joints Via Embedding Shape Memory Alloys in Polyjet 3D Printing," J. Intel. Mat. Sys. Struct., pp. 1-15 (2014).

Melchels, F. P.W., et al., "A review on stereolithography and its applications in biomedical engineering," Biomaterials, 31:6121-6130 (2010).

Men's Apollo Dress Shirt—White—Ministry of Supply, https://ministryofsupply.com/products/apollo-3-dress-shirt-white printed Aug. 20, 2019.

Merz, R, "Shape Deposition Manufacturing," Proceedings of the Solid Freeform Fabrication Symposium, The University of Texas at Austin, pp. 1-7 (1994).

Merz, R, et al., Dissertation entitled "Shape Deposition Manufacturing," pp. 1-190 (1994).

Mironov, V., et al., "Organ Printing: Computer-Aided Jet-Based 3D Tissue Engineering," Trends Biotech., 21(4):157-161 (2003).

MIT Media Lab—Tangible Media Group—bioLogic—https://tangible.media.mit.edu/project/biologic/ printed Aug. 20, 2019.

Morin, S.A., et al., "Using Click-e-Bricks to Make 3D Elastomeric Structures," Adv. Mater., 26: 5991-5999 (2014).

Mueller, S., et al., "faBrickation: Fast 3D Printing of Functional Objects by Integrating Construction Kit Building Blocks," Session: 3D Printing and Fabrication, 3827-3834 (2014).

Mueller, S., et al., "Mechanical Properties of Parts Fabricated with Inkjet 3D Printing Through Efficient Experimental Design," Materials and Design, 86:902-912 (2015).

Murphy, S.V. and Atala, A., "3D Bioprinting of Tissues and Organs," Nat. Biotech., 32(8):773-785 (2014).

Murray, C., "Smart Actuator Propels Hydraulic 'Beast of Burden'", Design News [online], Jun. 4, 2015 [retrieved Oct. 21, 2016]. Retrieved from the Internet URL: http://www.designnews.com/document.asp?doc_id=277754.

Nayakanti et al. "Twist-coupled kirigami cellular metamaterials and mechanisms," arXiv:1707.03673v1 [physics.app-ph] (2017).

Neville, R.M. et al., "Shape morphing Kirigami mechanical metamaterials," Scientific Reports, 6, 12 pages (2016).

Nike HyperAdapt. Self-Lacing Shoes—https://www.nike.com/us/en_us/c/innovation/hyperadapt printed Aug. 20, 2019.

O'Donnell, J., et al., "A Review on Electromechanical Devices Fabricated by Additive Manufacturing," J. of Manufacturing Science and Engineering, pp. 1-45 (2015).

Palmer, J.A., et al., "Realizing 3-D Interconnected Direct Write Electronics within Smart Stereolithography Structures," Proceedings of IMECE2005-2005 ASME International Mechanical Engineering Congress and Exposition, pp. 1-7 (2005).

Papadopoulou et al., "Auxetic materials in design and architecture," Nature Reviews—Materials, 2:17078, Dec. 5, 2017.

Papadopoulou et al., "Heat-active auxetic materials," in Active Matter, MIT Press (2017).

Park, S., et al., "Self-Assembly of Mesoscopic Metal-Polymer Amphiphiles," Science, 303: 348-351 (2004).

Pecle, B.N., et al., "3D Printing Antagonistic Systems of Artificial Muscle Using Projection Stereolithography," Bioinspir. Biomim., 10:1-8 (2015).

Popescu, G. A., et al., "Digital Materials for Digital Printing," Soc. Imaging Sci. Tech., pp. 58-61 (2006).

Popescu, G.A., "Digital Materials for Digital Fabrication," Thesis submitted to Massachusetts Institute of Technology, pp. 1-53 (Aug. 20, 2007).

Proto3000: "3D Printed Snow Globe by Proto3000—Thingiverse," Retrieved from the internet: http://www.thingiverse.com/thing:225572, Retrieved on: Jan. 10, 2017.

Raviv et al., Active Printed Materials for Complex Self-Evolving Deformations, Scientific Reports, 4:7422 (2014).

Review: The Arrow Smart Shirt—https://www.livemint.com/Leisure/RTUZItGjlnEBfTdPTYJFEN/Review-The-Arrow-Smart-Shirt.html printed Aug. 20, 2019.

Rossiter, J. et al., "Shape memory polymer hexachiral auxetic structures with tunable stiffness," Smart Materials and Structures, 23: 1-11 (2014).

Rost, A., and Schadle, S., "The SLS-Generated Soft Robotic Hand—An Integrated Approach Using Additive Manufacturing and Reinforcement Learning," IEEE: 215-220 (2013).

Rus, D. and Tolley, M.T., "Design, Fabrication and Control of Soft Robots," Nature, 521: 467-475 (2015).

Russo, A., et al., "Pen-On-Paper Flexible Electronics," Adv. Mater., 23: 3426-3430 (2011).

Saari, M., et al., "Fiber Encapsulation Additive Manufacturing: an Enabling Technology for 3D Printing of Electromechanical Devices and Robotic Components," 3D Printing, 2(1):32-39 (2015).

Safari, A., et al.. "Solid Freeform Fabrication of Piezoelectric Sensors and Actuators," J. Mat. Sci., 41: 177-198 (2006).

Saleh, E., et al., "3D Inkjet-Printed UV-Curable Inks for Multi-Functional Electromagnetic Applications," Proceedings of ISFA2014, pp. 1-5 (2014).

(56) References Cited

OTHER PUBLICATIONS

Sangani, K., "How to . . . Print Gadgets," Engineering & Technology, pp. 58-60 (2013).
Santulli, C. & Langella, C. "Study and development of concepts of auxetic structures in bio-inspired design," Int. J.Sustainable Design, 3:1 (2016).
Sharmis Passions, "Eggless Chocolate Cake—Moist Chocolate Cake Recipe (No eggs No butter)," http://www.sharmispassions.com/201 0/03/simple-moistchocolate-cakewith-no-eggs. html, pp. 1-37 (posted Mar. 27, 2010).
Sharon, E. et al., "The mechanics of non-Euclidean plates," Soft Matter, 6:5693-5704 (2010).
Sharon, Eran et al., "Leaves, Flowers and Garbage Bags: Making Waves," American Scientist, 92: 254-261 (2004).
Sharon, Eran., "Swell Approaches for Changing Polymer Shapes," Science, 335: 1179-1180.
Sitthi-Amorn, P., et al., "MultiFab: A Machine Vision Assisted Platform for Multi-Material 3D Printing," ACM Transactions on Graphics, Article No. 129, 34(4): 1-11 (2015).
Slightam, J.E. and Gervasi, V.R., "Novel Integrated Fluid-Power Actuators for Functional End-Use Components and Systems Via Selective Laser Sintering Nylon 12," 23rd Ann Int Solid Freeform Fabrication Symp: pp. 197-211 (2012).
Slotwinski, J.A., "Materials Standards for Additive Manufacturing," National Institute of Standards and Technology (NIST), PDES, Inc. Workshop (Mar. 14, 2013).
Snyder, T.J., et al., "3D Systems' Technology Overview and New Applications in Manufacturing, Engineering, Science, and Education," Mary Ann Liebert, Inc., 1(3):169-176 (2014).
Tabuchi, H. "Products and competition stretch market for 'athleisure' clothing," The New York Times, Mar. 25, 2016.
Takatsu, H., et al., "Stress Analysis Method of U-Shaped Bellows and Its Experimental Verification," Fusion Eng. & Des., 22: 239-250 (1993).
Tanaka, M., "Fatigue Life Estimation of Bellows Based on Elastic-Plastic Calculations," Int. J. Pres. Ves. & Piping, 2: 51-68 (1974).
"Suspended Depositions," NSTRMNT, Retrieved from the Internet at: nstrmnt.com/#/suspended-depositions/, Retrieved from the Internet on: Oct. 8, 2019, 5 pages.
Thomaszewski, B., et al., "Computational Design of Linkage-Based Characters," 9 pages (2014).
Thryft, Ann R., "3D Printing Now Good Enough for Final & Spare Car Parts," downloaded from www.designnews.com, 3 pages, (Jul. 22, 2016).
Tibbets, S. and Cheung, K., "Programmable Materials for Architectural Assembly and Automation," Assembly Automation, 32(3): 216-225 (2012).
Tibbits, S., "4D Printing: Self-Assembling Parts in Action at TED2013," by Stratasys Staff (Apr. 29, 2013).
Tibbits, Skylar J.E,. "4D Printing: Multi-Material Shape Change," Architectural Design Journal 84: 116-121 (2014).
Tibbits, Skylar., "Design to Self Assembly," Architectural Design Journal ,82(2): 68-73 (2012).
Tibbits, Skylar., "The Emergence of 4D Printing," TED Talk filed in Feb. 2012; transcript provided, 6 pages, video available at http://www.ted.com/talks/skylar_tibbits_the_emergence_of_4d_printing.html.
Tolley, M.T., et al., "A Resilient, Untethered Soft Robot," Soft Robotics, 1(3): 213-223 (2014).

Torrisi, F., et al., "Inkjet-Printed Graphene Electronics," Am. Chem. Soc., 6(4): 2992-3006 (2012).
Touloukian et al., "Thermal Expansion Metallic Elements and Alloys," Thermophysical Properties of Matter, vol. 12 (1975).
Touloukian et al., "Thermal Expansion Nonmetallic Solids," Thermophysical Properties of Matter, vol. 13 (1977).
Tu Delft, "4D Printing for Freeform Surfaces: Design Optimization of Origami Structures," Retrieved from the Internet at: https://youtu.be/vQB49vNFu14>, 1 page (2015).
Tumbleston, J.R., et al., "Continuous Liquid Interface Production of 3D Objects," Research Reports, 347(6228): 1349-1353 (2015).
Tunisianswife, Easy Chocolate Bundt Cake Glaze (allrecipies.com accessed Jun. 6, 2016) http://all recipes. com/recipe/1 00335/easy -choco late-bu ndt -cake-glaze/.
Ultem®/PEI (Polyetherimide): Aetna Plastics, Accessed: Jun. 1, 2016.
Waheed, S., "3D Printed Microfluidic Devices: Enablers and Barriers," Royal Society of Chemistry, Lab on a Chip, 16: 1993-2013 (2016).
Walker, S.B. and Lewis, J.A., "Reactive Silver Inks for Patterning High-Conductivity Features at Mild Temperatures," Am. Chem. Soc., 134: 1419-1421 (2012).
Wang, L., et al., "Robotic Folding of 2D and 3D Structures from a Ribbon," IEEE International Conference on Robotics and Automation (ICRA), pp. 3655-3660 (2016).
Weiss, L., et al., "Shape Deposition Manufacturing of Wearable Computers," pp. 31-38 (1996).
Weiss, L.E., et al., "Shape Deposition Manufacturing of Heterogeneous Structures," J. Manu. Sys., 16(4): 239-248 (1997).
Westbrook, K.K., et al., "A 3D finite deformation constitutive model for amorphous shape memory polymers: A multi-branch modeling approach for nonequilibrium relaxation processes," Mechanics of Materials 43: 853-869 (2011).
Whitney, J. P., et al., "A Low-Friction Passive Fluid Transmission and Fluid-Tendon Soft Actuator," 8 pages (2014).
Willis, K.D.D., et al., "Printed Optics: 3D Printing of Embedded Optical Elements for Interactive Devices," UIST'12, pp. 589-598 (Oct. 2012).
Wu, S-Y., et al., "3D-Printed Microelectronics for Integrated Circuitry and Passive Wireless Sensors," Microsystems & Nanoengineering, 1:1-9 (2015).
Xia, Fan and Jiang, Lei., "Bio-Inspired, Smart, Multiscale Interfacial Materials," Advanced Materials (20): 2842-2858 (2008).
Xie, T., "Tunable polymer multi-shape memory effect," Nature Letters, 464: 267-270 (2010).
Xu, S., et al., "Soft Microfluidic Assemblies of Sensors, Circuits, and Radios for the Skin," Science, 344: 70-74 (2014).
Xu, H., "Structurally Efficient Three-dimensional Metamaterials with Controllable Thermal Expansion," Scientific Report, 6, 8 pages (2016).
Yap, H.K., et al., "High-Force Soft Printable Pneumatics for Soft Robotic Applications," Soft Robotics, 3(3): 144-158 (2016).
Younsheng, L. and Shuiping, S., "Strength Analysis and Structural Optimization of U-Shaped Bellows," Int. J. Pres. Ves. & Piping, 42: 33-46 (1990).
Zhang, Q. et al., "Pattern Transformation of Heat-Shrinkable Polymer by Three-Dimensional (3D) Printing Technique," Scientific Reports, 5: 1-6 (2015).
Zhang, Q. et al., "Smart three-dimensional lightweight structure triggered from a thin composite sheet via 3D printing technique," Scientific Reports, 6, 8 pages (2016).

\* cited by examiner

FIG. 8A
FIG. 8B
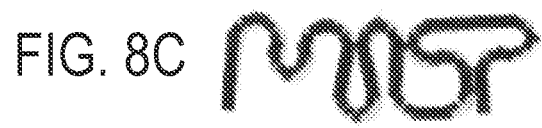
FIG. 8C
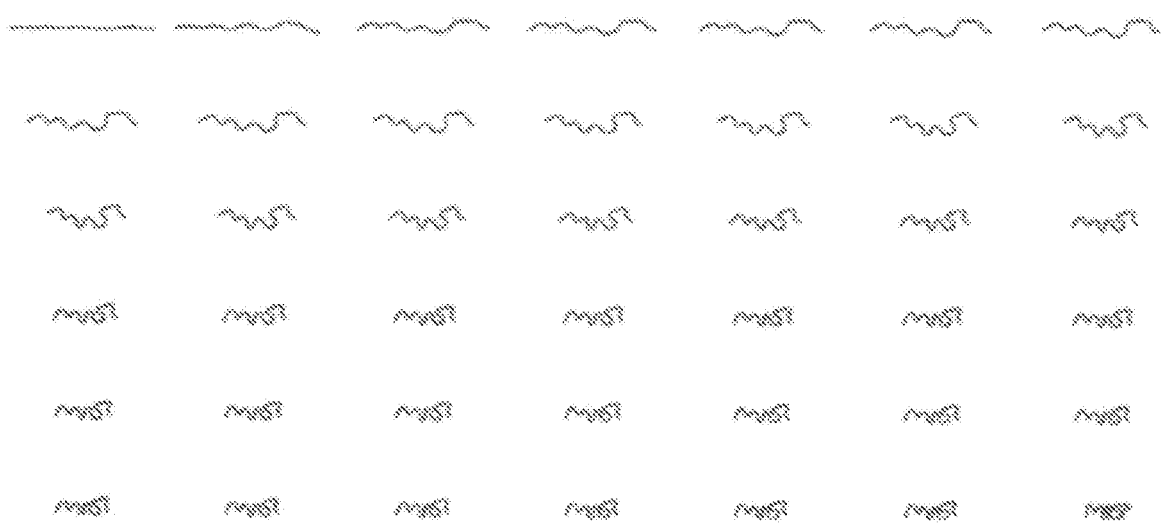
FIG. 8D

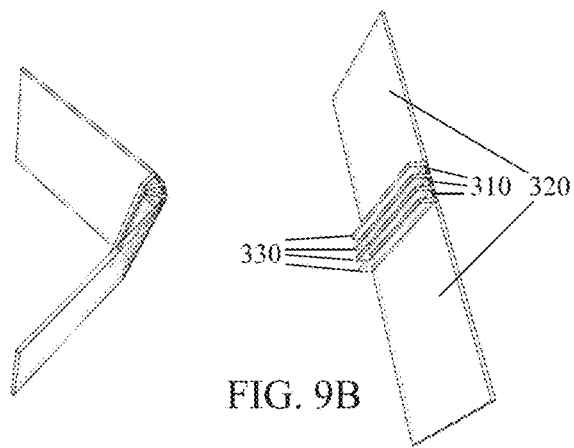
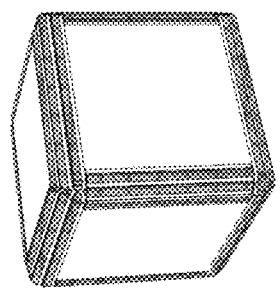
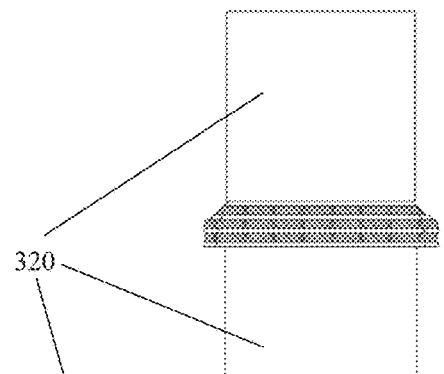
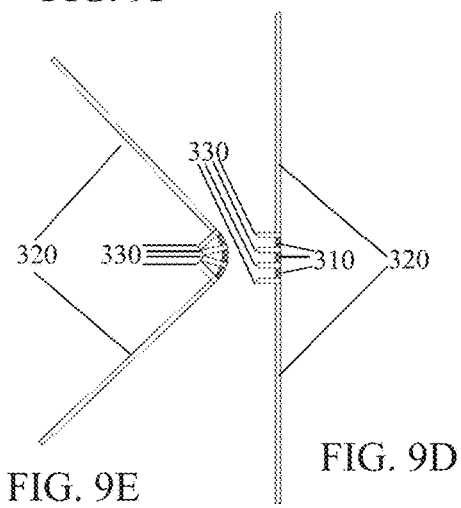
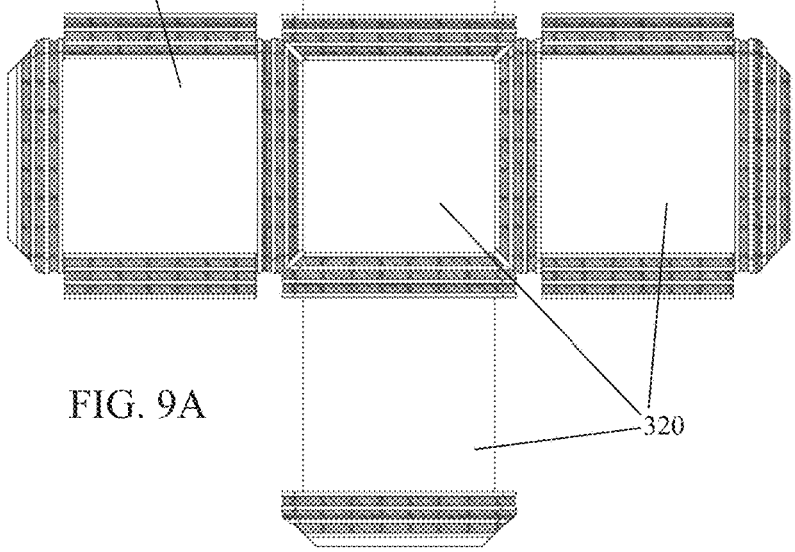
FIG. 9C
FIG. 9B
FIG. 9F
FIG. 9E
FIG. 9D
FIG. 9A

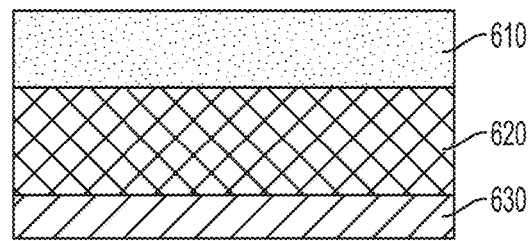
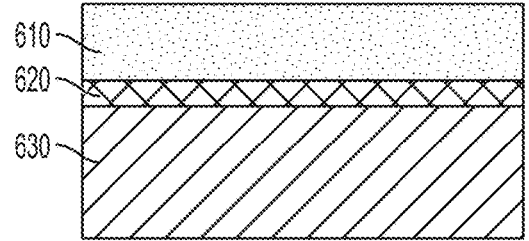
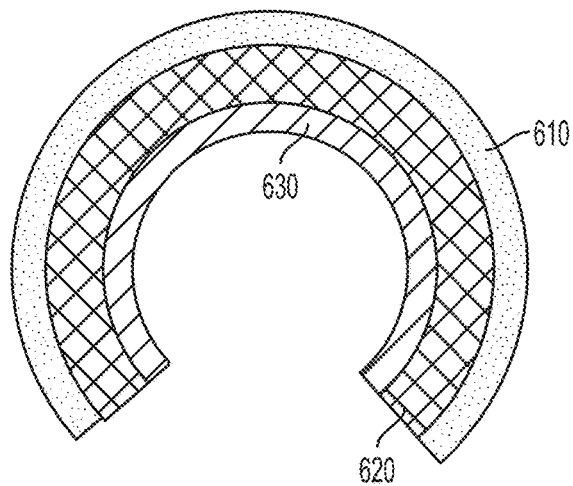
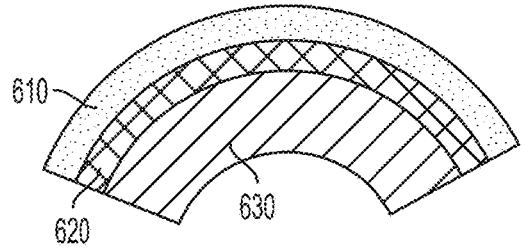
FIG. 15A
FIG. 15B

METHODS FOR ADDITIVE MANUFACTURING OF AN OBJECT

RELATED APPLICATIONS

This application is a divisional of U.S. application Ser. No. 14/189,819, filed on Feb. 25, 2014, which claims the benefit of U.S. Provisional Application No. 61/930,521, filed on Jan. 23, 2014, and U.S. Provisional Application No. 61/912,056, filed on Dec. 5, 2013. The entire teachings of the above applications are incorporated herein by reference.

COMMON OWNERSHIP UNDER JOINT RESEARCH AGREEMENT 35 U.S.C. 102(c)

The subject matter disclosed in this application was developed, and the claimed invention was made by, or on behalf of, one or more parties to a joint Research Agreement that was in effect on or before the effective filing date of the claimed invention. The parties to the Joint Research Agreement are the Massachusetts Institute of Technology, located in Cambridge, Mass., USA; and Stratasys Ltd., an Israeli company located at 2 Holzman Street, Rehovot, Israel 76124, and Stratasys, Inc., a Delaware corporation located at 7665 Commerce Way, Eden Prairie, Minn. 55344 (collectively, "Stratasys").

BACKGROUND OF THE INVENTION

Traditional manufacturing typically involves molded production of parts and other components having a fixed shape, and those individual components are frequently assembled into more complex structures. The process is often expensive and can involve a significant amount of manual labor, and molds used in the production are expensive to manufacture and have singular design structure.

Three-dimensional (3D) printing has been used to create static objects and other stable structures, such as prototypes, products, and molds. Three dimensional printers can convert a 3D image, which is typically created with computer-aided design (CAD) software, into a 3D object through the layerwise addition of material. For this reason, 3D printing has become relatively synonymous with the term "additive manufacturing." In contrast, "subtractive manufacturing" refers to creating an object by cutting or machining away material to create a desired shape.

SUMMARY OF THE INVENTION

Existing 3D printing technologies hold a promise of an ability to mass-produce customized components by substantially reducing the time and materials necessary, which can consequently increase efficiency. However, in some cases existing technology may still require additional processes, for example labor-intensive sorting and assembly of the 3D printed components in order to arrive at a desired final product.

Embodiments described herein provide another dimension to 3D printing technology. Particular arrangements of the additive manufacturing materials used in the 3D printing process can create a printed 3D object that transforms over time from a first, printed shape to a second, predetermined shape. Therefore, the combination of 3D printing technology plus the additional dimension of transformation over time of the printed object is referred to herein as 4D printing technology. This 4D printing technology in some cases provides a number of benefits over 3D printing technology.

In particular, some physical objects made through a 3D printing process that might otherwise have necessitated assembly or other post-processing of printed parts can be rapidly manufactured and assembled without requiring post-printing assembly, thereby reducing the time and costs associated with assembly. Objects can be printed in a first shape and transformed to a second, predetermined shape at a later time. For example, the objects can be printed and transported in a first shape that is flat, and then expanded to a second shape at a later time, such as upon arrival at a customer's location. This can permit more efficient shipping because the first (i.e., shipping) shape is more flat and requires a smaller shipping volume. Printing flat objects also requires significantly less printing time, thereby also reducing the overall fabrication costs.

Objects can be designed by reference to a second shape, and computer software loadable from a non-transient computer-readable medium can be used to calculate the first shape in which an object is printed for subsequent transformation to at least one second shape.

Disclosed herein is an object. The object can be made from an additive manufacturing material. The additive manufacturing material can have a response to an external stimulus and be configured to cause a predicted transformation of the object from a first manufactured shape to a second manufactured shape in response to the external stimulus. The external stimulus can be non-biasing with respect to the predicted transformation from the first manufactured shape to the second manufactured shape.

The external stimulus can be a temperature change. The additive manufacturing material can have a glass transition temperature of approximately 0° C. to approximately 150° C., or approximately 75° C. to approximately 90° C.

The additive manufacturing material can be a first additive manufacturing material, and the object can have a second additive manufacturing material arranged relative to the first additive manufacturing material to enable the predicted transformation of the object from the first manufactured shape to the second manufactured shape in response to the external stimulus. The second additive manufacturing material can have a second response to either the first external stimulus or to a second external stimulus to enable a corresponding second predicted transformation of the object to a third manufactured shape. The first and second additive manufacturing materials can compose the entire object.

The object can further include a third additive manufacturing material arranged relative to the first or second additive manufacturing materials, or both, and can have a third response to the first external stimulus, the second external stimulus, or a third external stimulus to enable a corresponding third predicted transformation of the object to a fourth manufactured shape. The first, second, and third additive manufacturing materials can compose the entire object. The third additive manufacturing material can have a third response that modifies the properties of one or more of the first or second additive manufacturing materials. The property modified can be the stiffness of one or more of the first and second additive manufacturing materials.

The external stimulus can be selected from the group consisting of a solvent, temperature change, electromagnetic energy, and pressure change.

The first and second additive manufacturing materials can be arranged to form a joint of the object. The joint can effect linear or rotational displacement of a first member of the object relative to a second member of the object. The joint can have at least one cylindrical disc or at least one rectangular member. Each of the first and second additive manufacturing materials composing the joint can have a three-dimensional structure. The joint can curl, fold, elongate linearly, decrease the size of a hole, form a curved crease, or expand linearly.

The first external stimulus can be a solvent. The first additive manufacturing material can be more hydrophilic than the second additive manufacturing material. The first additive manufacturing material can be formed of a polymerized formulation that includes one or more of hydrophilic acrylic monomers and oligomers. The first additive manufacturing material can be formed of a polymerized formulation that includes hydroxyethyl acrylate or poly(ethylene) glycol. The second additive manufacturing material can be formed of a polymerized formulation that includes one or more of hydrophobic acrylic monomers and oligomers. The second additive manufacturing material can be formed of a polymerized formulation that includes monomers of one or more of phenoxy ethyl acrylate, trimethylol propane triacrylate, and isobornyl acrylate. One or more of the first and second additive manufacturing materials can be formed of a polymerized formulation that further includes one or more of a photoinitiator, surface active agent, stabilizer, and inhibitor.

Also disclosed herein is a method for additive manufacturing of an object. The method can include dispensing an additive manufacturing material having a response to an external stimulus. The additive manufacturing material can be configured to cause a predicted transformation of the object from a first manufactured shape to a second manufactured shape in response to the external stimulus. The external stimulus can be non-biasing with respect to the predicted transformation from the first manufactured shape to the second manufactured shape.

The first additive manufacturing material can have a glass transition temperature of approximately 0° C. to approximately 150° C., or approximately 75° C. to approximately 90° C. The method can further include exposing the object to an external stimulus, wherein the external stimulus is a temperature change.

The additive manufacturing material can be a first additive manufacturing material, and the method can further include dispensing a second additive manufacturing material arranged relative to the first additive manufacturing material to enable the predicted transformation of the object from the first manufactured shape to the second manufactured shape in response to the external stimulus. The external stimulus can be a first external stimulus, and the second additive manufacturing material can have a second response to either the first external stimulus or to a second external stimulus to enable a corresponding second predicted transformation of the object to a third manufactured shape. The first and second additive manufacturing materials can compose the entire object.

The method can further include dispensing a third additive manufacturing material arranged relative to the first or second additive manufacturing materials, or both, and having a third response to the first external stimulus, the second external stimulus, or a third external stimulus to enable a corresponding third predicted transformation of the object to a fourth manufactured shape. The first, second, and third additive manufacturing materials can compose the entire object. The third response of the third additive manufacturing material can modify the properties of one or more of the first or second additive manufacturing materials. The property modified can be the stiffness of one or more of the first and second additive manufacturing materials.

The first and second additive manufacturing materials can be arranged to form a joint of the object. The joint can effect linear or rotational displacement of a first member of the object relative to a second member of the object. The joint can have at least one cylindrical disc or at least one rectangular member. Each of the first and second additive manufacturing materials composing the joint can have a three-dimensional structure. The joint can curl, fold, elongate linearly, decrease the size of a hole, form a curved crease, or expand linearly.

The first additive manufacturing material can be more hydrophilic than the second material. The first additive manufacturing material can be formed of a polymerized formulation that includes one or more of hydrophilic acrylic monomers and oligomers. The first additive manufacturing material can be formed of a polymerized formulation that includes hydroxyethyl acrylate or poly(ethylene) glycol. The second additive manufacturing material can be formed of a polymerized formulation that includes one or more of hydrophobic acrylic monomers and oligomers. The second additive manufacturing material can be formed of a polymerized formulation that includes monomers of one or more of phenoxy ethyl acrylate, trimethylol propane triacrylate, and isobornyl acrylate. One or more of the first and second additive manufacturing materials can be formed of a polymerized formulation that further includes one or more of a photoinitiator, surface active agent, stabilizer, and inhibitor. The method can further include exposing the object to an external stimulus selected from the group consisting of a solvent, temperature change, electromagnetic energy, and pressure change. The external stimulus can be a polar solvent. The polar solvent can be selected from the group consisting of water, an alcohol, and combinations thereof.

Exposing the object to an external stimulus can cause one or more of curling, folding, stretching, shrinking, and curved creasing.

Also disclosed herein is an object of additive manufacture prepared according to the method described above. The method of forming the object can include dispensing an additive manufacturing material having a response to an external stimulus. The additive manufacturing material can be configured to cause a predicted transformation of the object from a first manufactured shape to a second manufactured shape in response to the external stimulus. The external stimulus can be non-biasing with respect to the predicted transformation from the first manufactured shape to the second manufactured shape.

The first additive manufacturing material can have a glass transition temperature of approximately 0° C. to approximately 150° C., or approximately 75° C. to approximately 90° C. The method of forming the object can further include exposing the object to an external stimulus, wherein the external stimulus is a temperature change.

The additive manufacturing material can be a first additive manufacturing material, and the method can further include dispensing a second additive manufacturing material arranged relative to the first additive manufacturing material to enable the predicted transformation of the object from the first manufactured shape to the second manufactured shape in response to the external stimulus. The external stimulus can be a first external stimulus, and the second additive manufacturing material can have a second response to either the first external stimulus or to a second external stimulus to enable a corresponding second predicted transformation of the object to a third manufactured shape. The first and second additive manufacturing materials can compose the entire object.

The method of forming the object can further include dispensing a third additive manufacturing material arranged relative to the first or second additive manufacturing materials, or both, and having a third response to the first external stimulus, the second external stimulus, or a third external stimulus to enable a corresponding third predicted transformation of the object to a fourth manufactured shape. The first, second, and third additive manufacturing materials can compose the entire object. The third response of the third additive manufacturing material can modify the properties of one or more of the first or second additive manufacturing materials. The property modified can be the stiffness of one or more of the first and second additive manufacturing materials.

The first and second additive manufacturing materials can be arranged to form a joint of the object. The joint can effect linear or rotational displacement of a first member of the object relative to a second member of the object. The joint can have at least one cylindrical disc or at least one rectangular member. The joint can curl, fold, elongate linearly, close a hole, form a curved crease, or expand linearly.

The first additive manufacturing material can be more hydrophilic than the second material. The first additive manufacturing material can be formed of a polymerized formulation that includes one or more of acrylic monomers and oligomers. The first additive manufacturing material can be formed of a polymerized formulation that includes hydroxyethyl acrylate. The second additive manufacturing material can be formed of a polymerized formulation that includes one or more of hydrophobic acrylic monomers and oligomers. The second additive manufacturing material can be formed of a polymerized formulation that includes monomers of one or more of phenoxy ethyl acrylate, trimethylol propane triacrylate, and isobornyl acrylate. One or more of the first and second additive manufacturing materials can be formed of a polymerized formulation that further includes one or more of a photoinitiator, surface active agent, stabilizer, and inhibitor. The method of forming the object can further include exposing the object to an external stimulus selected from the group consisting of a solvent, temperature change, electromagnetic energy, and pressure change. The external stimulus can be a polar solvent. The polar solvent can be selected from the group consisting of water, an alcohol, and combinations thereof.

Exposing the object to an external stimulus can cause one or more of curling, folding, stretching, shrinking, and curved creasing.

Further disclosed herein is a non-transient computer readable medium having stored thereon a sequence of instructions. When executed by a processor, the sequence of instructions can cause an apparatus to access a database that includes first parameters of additive manufacturing materials, access the database that includes second parameters for arranging one or more additive manufacturing materials relative to each other to form at least a portion of an object having a first manufactured shape in an absence of an external stimulus and having a second, predicted manufactured shape in a presence of, or following exposure to, an external stimulus, and calculate, as a function of the first and second parameters, a sequence of machine-controllable instructions that, when provided to a machine, programs the machine to produce the object in the first manufactured shape.

The database can further include parameters of an environment in which the object will be employed. The sequence of instructions can further cause the apparatus to calculate machine-controllable instructions as a function of the environment or adjust the previously calculated machine-controllable instructions as a function of the environment.

The external stimulus can be one or more of a solvent, temperature change, electromagnetic energy, and pressure change. The machine-controllable instructions can cause the apparatus to dispense a first additive manufacturing material. The machine-controllable instructions can cause the apparatus to dispense a second additive manufacturing material in an arrangement relative to first additive manufacturing material to enable a predicted transformation of the object from a first manufactured shape to a second manufactured shape in response to the first external stimulus.

The external stimulus can be a first external stimulus, and the predicted transformation can be a first predicted transformation and can further include a third additive manufacturing material arranged relative to the first or second additive manufacturing materials, or both, wherein the third additive manufacturing material has a third response to the first external stimulus or a second external stimulus to enable a corresponding second predicted transformation of the shape of the object in response to the first or second external stimulus.

The database can include a library of joints. The joints can include one or more of a curling joint, a folding joint, a linear elongation joint, a joint that decreases the size of a hole, a curved-crease joint, and a linear expansion joint.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7C is a schematic representation of an arrangement of a generally cylindrical object having a series of joints that has transformed into an object that spells the letters "MIT" after exposure to an external stimulus.

FIG. 7D is a schematic illustrating an example joint that can be used to spell letters upon, or following, exposure to an external stimulus.

FIG. 7E is a schematic illustrating the example joint of FIG. 7D after exposure to an external stimulus.

FIGS. 8A-8D are a series of time-lapsed line drawings showing a transformation from a generally cylindrical object to an object that spells the letters "MIT."

FIG. 9A is a top view of a schematic representation of an object that can transform into a cube having solid sides upon, or following, exposure to an external stimulus.

FIG. 9B is perspective view of a schematic representation of two panels having a joint that can fold upon, or following, exposure to an external stimulus.

FIG. 9C is a side view of a schematic representation of two panels having a joint that has folded upon exposure to an external stimulus.

FIG. 9D is a perspective view of a schematic representation of two panels having a joint that can fold upon, or following, exposure to an external stimulus.

FIG. 9E is a side view of a schematic representation of two panels having a joint that has folded after exposure to an external stimulus.

FIG. 9F is a schematic representation of an object that has transformed into a cube having solid sides after exposure to an external stimulus.

FIGS. 15A-B are schematic representations of an arrangement of two low swelling materials and a high swelling material.

DETAILED DESCRIPTION OF THE INVENTION

Figure 1:
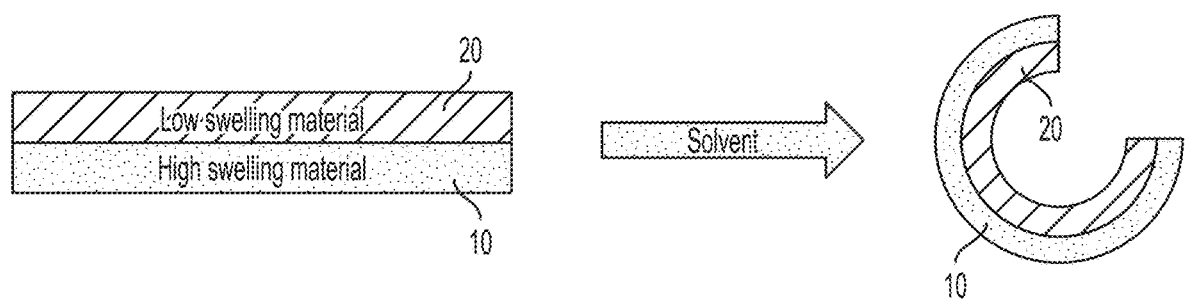
FIG. 1 is a schematic representation of an arrangement of a low swelling material and a high swelling material.

A description of example embodiments of the invention follows.

As used herein, the term "object" and "objects" refers to physical objects produced by an additive manufacturing process.

As used herein, the term "a," as used in describing "a first additive manufacturing material," "a second additive manufacturing material," and "a third additive manufacturing material," means "at least one." It should be understood that first, second, and third additive manufacturing materials are often described herein for ease of convenience; however, any number of additive manufacturing materials can be used to create a range of transformations over time in various combinations at joints or other locations of objects or objects in their entireties.

As used herein, the term "manufactured shape" refers to a predetermined geometrical shape. For example, a manufactured shape is different from a shape that would occur if an additive manufacturing material were simply melted post-manufacturing in an uncontrolled manner. Thus, a manufactured shape can be the shape of an object as it is produced by an additive manufacturing apparatus, such as a 3D printer. A manufactured shape can also be a shape having a distinct structure and/or function. In other words, a shape that is not a predetermined shape is not a manufactured shape. An object according to embodiments disclosed herein can have a first manufactured shape and at least one second manufactured shape, wherein a predicted transformation occurs to change a state of a manufactured object from the first manufactured shape to the at least one second manufactured shape. It should be understood that the term "predetermined" does not mean that every parameter, such as volume, angle, stiffness, etc., is known in advance, but rather that a shape is considered to be a manufactured shape generally predicted at the time of manufacturing the object. Depending upon the type of transformation, the actual shape may differ from the predetermined shape by ±5%, ±10%, ±30%, or ±50%.

As used herein, the term "non-biasing," as used with respect to an external stimulus, means that the external stimulus does not apply a mechanical or other force on the object in order to transform the object from one manufactured shape to another manufactured shape that is different from the transformation(s) encoded in the object, as described herein. For example, exposing an object to an external stimulus, such as exposure to a solvent, temperature change, electromagnetic energy (e.g., light), or pressure change is a non-biasing external stimulus because it does not apply a mechanical force more in any particular spatial direction.

4D Printing

Four dimensional (4D) printing is a novel process that entails the multi-material printing of objects having the capability to transform over time. As described herein, three of the dimensions are spatial, and the fourth dimension refers to the transformation of an object over time. For example, printed structures can transform from a first shape into at least one second shape due to exposure to at least one external stimulus.

Multi-material three-dimensional (3D) printing technologies can allow for fabrication of 3D objects having a heterogeneous composition. For example, 3D printed objects can be composed of two or more materials that differ in one or more of their physical and chemical properties. The OBJET® line of 3D printers (Stratasys Ltd., Israel) can be used for the 3D printing of multi-material objects. Such printers are described in U.S. Pat. Nos. 6,569,373; 7,225,045; 7,300,619; and 7,500,846; and U.S. Patent Application Publication Nos. 2013/0073068 and 2013/0040091, each of the teachings of which being incorporated herein by reference in their entireties. The STRATASYS® CONNEX™ multi-material printers provide multi-material POLYJET™ printing of materials having a variety of properties, including rigid and soft plastics and transparent materials, and provide high-resolution control over material deposition.

Printing materials having differing physical or chemical properties provides a user with the capability of programming object structure and composition in order to achieve specific functionality. For example, different combinations of a first, or a first and second (or more), additive manufacturing materials can form complex objects that cannot be generated otherwise in a single process. Among other uses, single or multi-material 3D printing can be used to generate heterogeneous objects having areas of different stiffness. When the shape of these areas have a preferred orientation, an object having anisotropic properties can be formed. One example is an object having different properties (e.g., elastic modulus) in different directions (e.g., X/Y/Z). Property gradients can also be formed by gradually modifying the ratio of components having different properties. For example, the ratio of low and high swell components can be modified over a specific line or plane in the 3D object. Layered structures can be made, where a rigid component is wrapped or placed over a soft component. Alternatively, a soft component can be wrapped or layered over a rigid component, or the structure can include more than two layers. This is used, for example, for functional living hinge construction. An object can be printed in a first shape that, upon exposure to an external stimulus, transforms into a second, predetermined shape. For example, a gradient of the first and second additive manufacturing materials can be varied to cause more or less curvature during the transformation.

Current 3D printers can also utilize support materials. For example, a support material can support a 3D printed object during the printing process, which may be desirable or necessary if the object has a shape that cannot support itself (e.g., the shape has overhangs that, without support material or support material constructions, would not be printable). The support material can be positioned prior to beginning the 3D printing process, or it can be printed by the 3D printer substantially simultaneously with the printing of the additive manufacturing material. In some cases, the support material can be removable after the printing process is complete (e.g., by mechanical force, such as by use of a water-jet apparatus). Typically, the support material is removed before transforming the object from a first shape into a second shape.

One of skill in the art will understand that in all of the specific examples described herein, it may be necessary to cure (e.g., polymerize) the object of additive manufacture (i.e., the formulation or formulations that make up the cumulative layers of the object). For example, it may be necessary to cure the object prior to removal of support material, if any, and transformation of the shape of the object.

It should be understood that while many of the embodiments described herein include at least two additive manufacturing materials, other embodiments can employ a single, given manufacturing material. The additive manufacturing operations can, for example, include applying more layers of the given additive manufacturing material in certain locations and fewer, or none, in others to encode a response to an external stimulus to cause a predicted transformation to the shape of the object.

Using the ability to print several materials with different properties simultaneously and control the placement of each material in 3D, the listed abilities and examples are made possible.

Joints

The object can have a first shape having joints. The joints can be formed of different material types, such as a high swelling material and a low swelling material. Upon exposure to an external stimulus, the high swelling material can swell, causing a transformation in the shape of the joint. For example, the joint can curl, fold, stretch, shrink, and form a curved crease.

In one embodiment, a joint can curl. For example, a curling joint can be formed by creating an object having a layer of a low swelling material adjacent to a layer of a high swelling material. Upon, or after, exposure to an external stimulus, the object will curl away from the high swelling material (i.e., the low-swelling material will be on the inside of the curl).

In one embodiment, a joint can fold. In one particular embodiment, the joint can fold approximately 90° in either the clockwise or counterclockwise direction. In another embodiment, a high swelling material expands so that two or more portions of low swelling material contact each other. The portions of low swelling material are shaped so that their forced interaction restricts the degree of curvature.

In another embodiment, concentric rings of a high swelling material can be alternated with concentric rings of a low swelling material along a longitudinal axis. Upon, or after, exposure to an external stimulus, the high swelling material expands, resulting in linear elongation.

In another embodiment, a hole or lumen decreases in size upon exposure to an external stimulus. A cylindrical object can have an exterior portion formed of a low swelling material and an interior portion formed of a high swelling material, wherein the interior portion has a lumen. Upon, or after, exposure to an external stimulus, the high swelling material in the interior of the joint expands and decreases the diameter of the lumen.

In another embodiment, the joint can form a curved crease upon exposure to an external stimulus. A curved crease can form when low swelling portions of a structure constrain the deformation of a joint in a way that creates deformation along other directions. A first example can be formed from concentric, alternating rings of high and low swelling material. A second example can be formed by depositing a gradient of two additive manufacturing materials. The center of the object can be a low swelling material while the periphery is a high swelling material.

In another embodiment, the joint can undergo linear expansion. A linear expander can have a first end portion and a second end portion that are formed, at least partially, of a low swell material. The first and second end portions are connected via two low swell portions that have curves that are mirror images of each other. For example, the low swell portion on the left travels upwards from the first end portion, curves counterclockwise for approximately 90°, then curves clockwise for approximately 180°, then curves counterclockwise for approximately 90°. The low swell portion on the left has three distinct adjacent high swell portions. A first high swell portion is affixed on the lower, exterior portion of the low swell material curve. A second high swell portion is affixed on the middle, interior portion of the low swell material. A third high swell portion is affixed on the upper, exterior portion of the low swell material. The low swell portion on the right travels along a trajectory that is a mirror image of low swell portion on the left, and the high swell portions on the right are similarly mirror images. Upon exposure to an external stimulus, the three high swell portions expand, causing the linear expander to expand. In other words, the linear expansion joint has portions connected by an arrangement of low and high swelling materials that form curling joints, the synergistic effect of which is to provide linear expansion.

In general, the joints disclosed herein have a three dimensional structure, which differs from joints that have only a two dimensional structure. For example, some of the joints have portions that mechanically interfere with each other to attune the amount of folding.

Solvent-Based Transformation

In one embodiment, an additive manufacturing system can deposit at least two different additive manufacturing materials. After solidification (e.g., polymerization), the two additive manufacturing materials can have differing degrees of swelling upon exposure to an external stimulus. As illustrated in FIG. 1, a high swelling material 10 can be printed adjacent to a low swelling material 20. The high swelling material 10 has a first response to an external stimulus, and the low swelling material 20 has a second response to an external stimulus. In this example, the first response is a greater degree of swelling upon exposure to the external stimulus, and the second response is a lesser degree of swelling upon exposure to the external stimulus. In many cases, the low swelling material 20 has a minimal or undetectable response to the external stimulus. In the arrangement of FIG. 1, exposure to an external stimulus causes the high swelling material 10 to swell more than the low swelling material 20. As a result, the object transforms from a first shape into a second shape by curling. The extent of distortion depends primarily on three factors. First, a greater relative degree of swelling between the two materials leads to a greater degree of deformation. Second, the relative stiffness of the high and low swelling materials affects the extent of distortion. A stiffer high swelling material and a softer low swelling material will permit greater deformation. However, a very soft low swelling material can be inefficient in creating deformation and, alternatively, the overall structure may expand but not change shape. In other words, if the low swelling material is very soft, it will not exert enough force to resist the high swelling material, so overall shape will not change. Third, a thicker high swelling layer or a thinner low swelling material (or both) will cause greater deformation.

A variety of combinations of high and low swelling materials can be used. Typically, the high and low swelling materials will be selected based on their response to a particular external stimulus. One example of an external stimulus involves exposing the object to a solvent. As one example, the solvent can be water, and the high swelling material 10 is more hydrophilic than the low swelling material 20. Stated differently, the low swelling material 20 is more hydrophobic than the high swelling material 10. Alternatively, the external stimulus can be exposure to a humid environment.

The high swelling material 10 can be a 3D printable material that swells in an aqueous solvent. Particular types of materials include UV-curable materials and other thermosetting materials. After deposition of formulations and during the printing process, the deposited material can be exposed to UV light or heat to cure (e.g., polymerize) the material, resulting in a cured additive manufacturing material having hydrophilic properties. One particular example is a hydrophilic material that can be produced by polymerizing a formulation formed of one or more hydrophilic monomers and oligomers. Suitable examples are hydroxyethyl acrylate and poly(ethylene) glycol. Other examples include formulations composed of vinyl ethers, acrylamides, and/or epoxides.

A suitable UV-curable formulation resulting in a hydrophilic material after polymerization can include approximately 50 to 90 percent of hydrophilic acrylic monomers and approximately 60 to 80 percent of oligomers. More preferably, a suitable formulation for a hydrophilic material can include approximately 60 to 80 percent of a hydrophilic acrylic monomer and approximately 10 to 20 percent of oligomers.

A generalized formulation for a hydrophilic material is disclosed in Table 1, which shows the approximate ranges of components.

TABLE 1

| Amount by weight (percent) | Component |
| --- | --- |
| 50-90% | Hydrophilic acrylic monomer |
| 10-50% | Hydrophobic oligomer |
| 1-3% | Photoinitiator |
| 0.1-0.2% | Surface active agent |
| 0.1-0.2% | Stabilizer or inhibitor |

One particular example of a formulation for producing a hydrophilic material is disclosed in Table 2. In the particular formulation disclosed in Table 2, the hydrophilic monomer is hydroxyethyl acrylate; the hydrophobic oligomer is composed of a difunctional bisphenol A based epoxy acrylate; the photoinitiator is an alphahydroxyketone; the surface active agent is a silicone containing surface additive; and the inhibitor is a hydroquinone.

TABLE 2

| Amount by weight (grams) | Component |
| --- | --- |
| 70 | Hydroxyethyl acrylate |
| 15 | Difunctional bisphenol A based epoxy acrylate |
| 2 | Alphahydroxyketone |
| 0.1 | Silicone containing surface additive |
| 0.2 | Hydroquinone |

For the hydrophilic material described in Table 2, a suitable external stimulus can be a polar solvent, such as water or an alcohol.

The low swelling material 20 can be a 3D printable material that does not swell, or that swells minimally, when exposed to an aqueous solution. A formulation that includes one or more of hydrophobic acrylic monomers and oligomers is an example of a formulation that, after curing (e.g., polymerization), results in a hydrophobic material. Suitable examples are disclosed in U.S. Pat. No. 7,851,122, the entire teachings of which are incorporated herein by reference. Particularly suitable examples include phenoxy ethyl acrylate, trimethylol propane triacrylate, and isobornyl acrylate.

Each of the hydrophilic and hydrophobic formulations can include one or more of a photoinitiator, stabilizer, surfactant, or colorant.

In one embodiment, it is possible to obtain a material having controlled hydrophilicity by simultaneous deposition of low and high hydrophilic formulations in predetermined ratios. For example, this procedure can be used to produce a gradient of hydrophilicity within the material.

Temperature-Based Transformation

In another embodiment, an additive manufacturing process can be used to print an object having a first shape. This temperature-based transformation can occur where the first and second additive manufacturing materials have significantly different coefficients of thermal expansion.

In one example, the object can soften when heated a first time, and external force can be applied to transform the object into a second shape. When cooled down, the object retains the second shape. When heated a second time, the object reverts to the first shape. Thus, the energy externally applied in the first deformation is released upon exposure to an external stimulus, the second heating.

In another example, a shape can be printed from two additive manufacturing materials, a high swelling material and a low swelling material. The shape can be immersed in hot water and deformed. The low-swelling material softens due to the heat and allows the swelling material to deform to the shape as it swells. The shape is then cooled and dried at ambient temperature to yield a cool, dry, deformed shape because as it cools, the low swelling material becomes rigid again and prevents the shape from reverting as the high swelling material dries and contracts. The shape is then exposed to heat, which causes the shape to revert to the originally printed shape.

Several different types of 3D printable materials are suitable. Typically, the material is rigid below its glass transition temperature (Tg) but soft and flexible above its Tg. One particular material is the OBJET® VeroWhitePlus™ RGD835 (Stratasys Ltd., Israel), which is rigid and stiff at room temperature but very soft and flexible at 90° C. As another example, the OBJET® DurusWhite™ RGD30 material (Stratasys Ltd., Israel) is rigid and stiff at room temperature but very soft and flexible at 75° C. In one embodiment, the Tg can range from approximately 75° to approximately 90° C. One of skill in the art will recognize, however, that the Tg is not restricted to the range of approximately 75° C. to approximately 90° C. Rather, a wide variety of thermosetting plastics are suitable, and the Tg can be any temperature that is suitable for the particular application, e.g., approximately 0° C. to approximately 150° C.

More complex predicted transformations are also contemplated. For example, an object can be printed from multiple materials, each of which has a different Tg, thereby allowing several shape transformations that occur at different temperatures.

In addition, temperature-based materials can be combined with swelling-based systems to create an object that transforms in response to both exposure to solvent and temperature changes. For example, a rigid hydrophobic material with a Tg of approximately 60° C. can be combined with a hydrophilic material. When placed in hot water, the first material softens and the hydrophilic material swells, causing transformation. When removed to room temperature, the first material becomes rigid again and retains its shape, even when the swollen material dries. To reverse the first transformation, the deformed structure can be heated, which causes the rigid material to soften and the object to revert to its original shape.

Pressure-Based Transformation

In another embodiment, an external stimulus can be a change in pressure. For example, a cylindrical object having a multimaterial composition can be printed by a 3D printer. The exterior of the cylinder can be made of a first material that is relatively rigid. The interior of the cylinder can be a second material that is a soft, elastomer or other elastomer-like material (e.g., polymerized OBJET® TangoPlus™ FLX930 material). The cylinder can have a lumen through the middle. In response to a change in pressure, the second material will change, thereby causing deformation and changing the shape of the object.

Electromagnetic Energy-Based Transformation

In another embodiment, an external stimulus can be exposure to electromagnetic energy. For example, an object can be formed of two different materials having differential absorption characteristics of electromagnetic energy. Upon, or following, exposure to electromagnetic energy, a first material will heat up more than a second material. The electromagnetic energy can be within the infrared, visible, ultraviolet, or other portion of the electromagnetic spectrum.

Apparatus and Non-Transient Computer Readable Medium for 4D Printing

Figure 14:
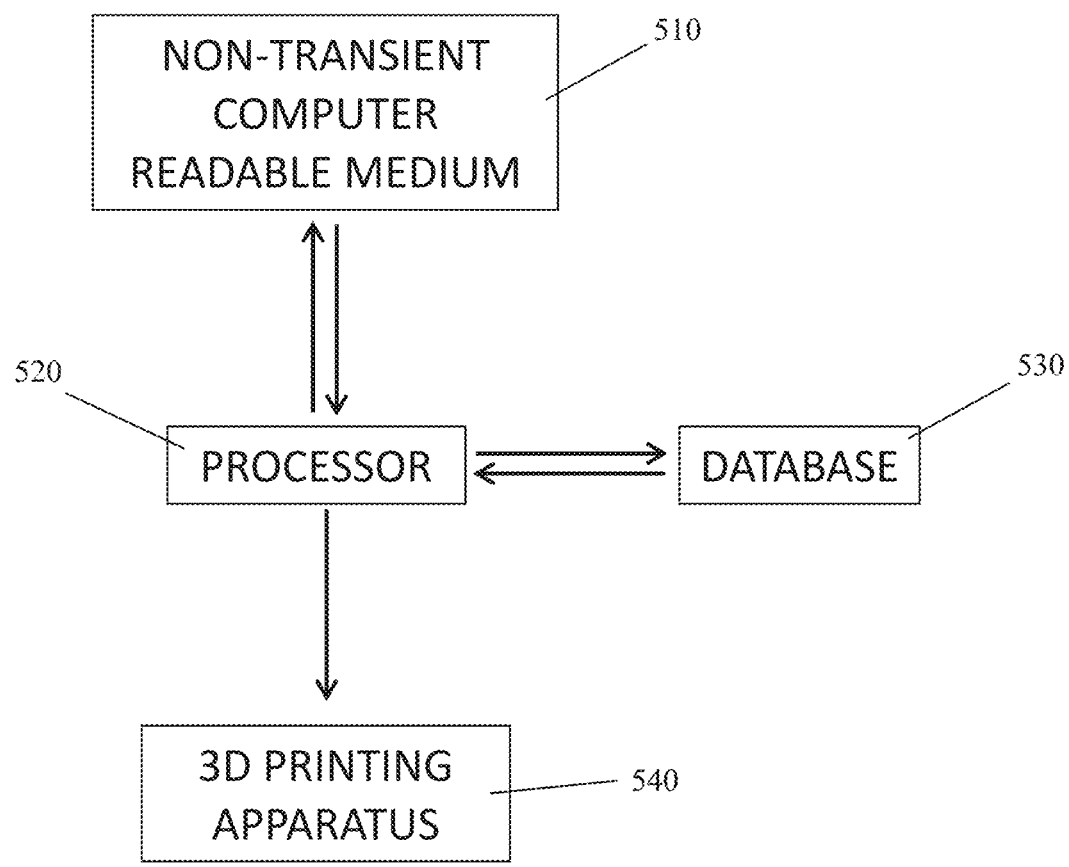
FIG. 14 is a block diagram of a 3D printing apparatus.

FIG. 14 is a block diagram of an apparatus for multimaterial 3D printing. Stored on the non-transient computer readable medium 510 is a sequence of instructions. When executed by a processor 520, the sequence of instructions causes a processor to access a database 530 that includes first parameters of additive manufacturing materials and second parameters for arranging the additive manufacturing materials relative to each other to form at least a portion of a shape of an object having a first shape in an absence of an external stimulus and having a second, predicted shape in a presence of, or following exposure to, the external stimulus. The processor 520 can access the non-transient computer readable medium 510 and the database 530 either via a local connection or via a computer network. The processor can calculate, as a function of the first and second parameters, a sequence of machine-controllable instructions that, when provided to a 3D printing apparatus 540, programs the 3D printing apparatus 540 to produce the object in the first shape.

The database can further include parameters of an environment in which the object will be employed. The sequence of instructions can further cause the processor 520 to calculate machine-controllable instructions as a function of the environment or adjust the previously calculated machine-controllable instructions as a function of the environment. The external stimulus can be exposure to a solvent, temperature change, electromagnetic energy, or pressure changes. The machine-controllable instructions can cause the 3D printing apparatus 540 to dispense a first additive manufacturing material and a second additive manufacturing material in an arrangement relative to each other to enable a predicted transformation of the shape in response to the external stimulus. The external stimulus can be a first external stimulus, and the predicted transformation can be a first predicted transformation.

The machine-controllable instructions can further cause the 3D printing apparatus 540 to dispense a third additive manufacturing material arranged relative to the first or second additive manufacturing materials, or both. The third additive manufacturing material can have a third response to the first external stimulus or a second external stimulus to enable a corresponding second predicted transformation of the shape of the object in response to the first or second external stimulus.

EXEMPLIFICATION

Example 1: Formation of a Cube

In this example, a generally cylindrical object transforms into a first generation of a fractal Hilbert curve in the shape of a cube.

Figure 2:
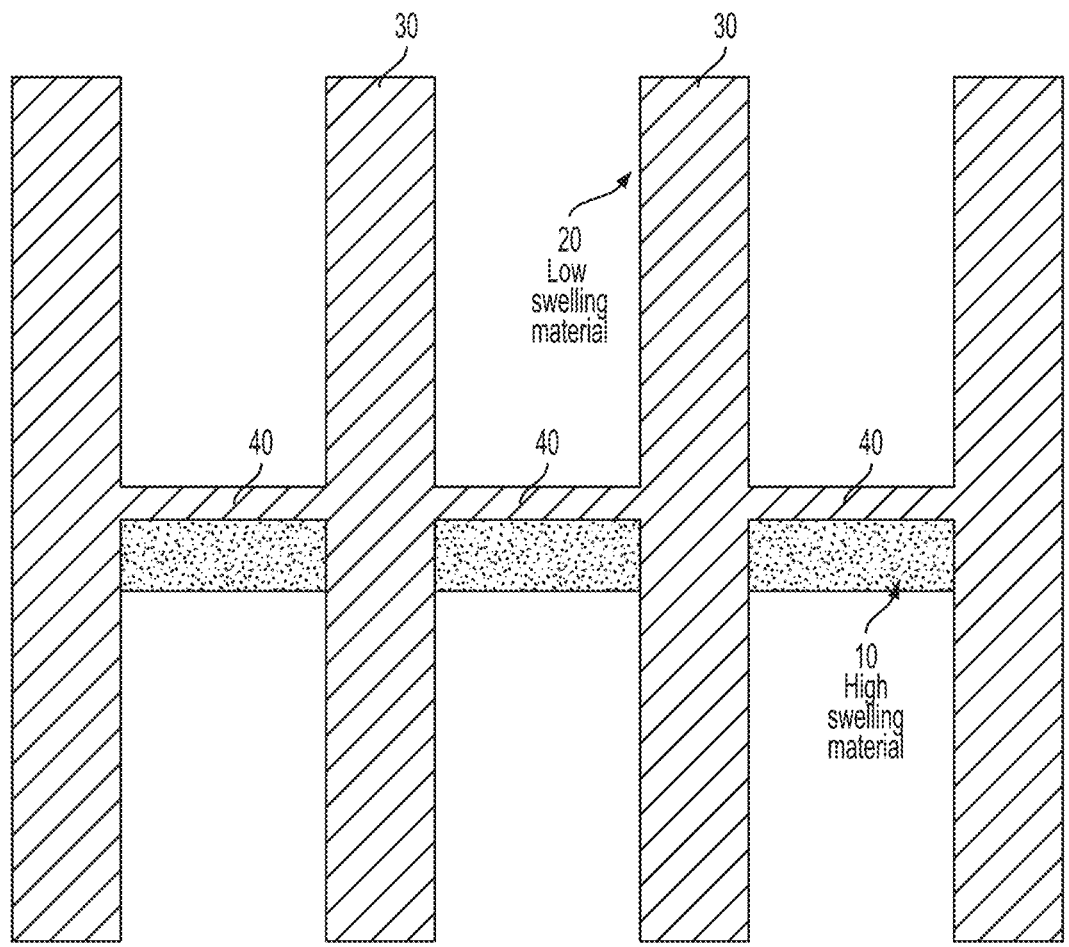
FIG. 2 is a schematic representation of an arrangement of a low swelling material and a high swelling material that can form a folding joint.

FIG. 2 is a schematic representation of an arrangement of a low swelling material and a high swelling material that can form a folding joint. The object has a generally cylindrical shape. Two cylindrical discs 30 are spaced apart by a horizontal member 40. The high swelling material 10 is placed on one side of the horizontal member 40. The cylindrical discs 30 and horizontal members 40 are made of a low swelling material. For example, the high swelling material can be more hydrophilic than the low swelling material. Stated differently, the low swelling material can be more hydrophobic than the high swelling material. The cylindrical discs 30 function as angle limiters. Upon exposure to an external stimulus, the cylindrical discs 30 force the joint to fold to an approximately 90° angle. In order to change the curvature of the joint, the spacing or diameter of the cylindrical discs can be changed. Increasing the spacing between the cylindrical discs creates a more acute angle. If the cylindrical discs are spaced more closely together, very little folding will occur because the discs will contact each other and prevent further folding. The number of discs can also be modified as well.

Figure 3A:
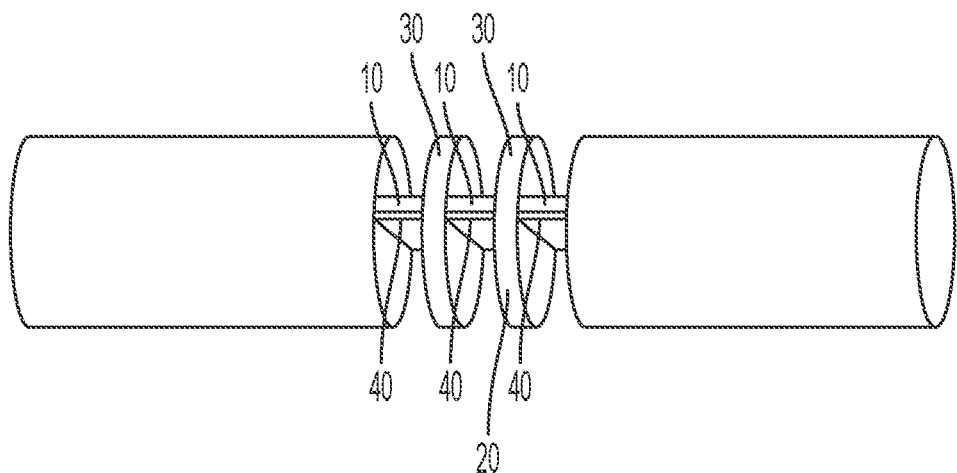
FIG. 3A is a computer generated model of an object formed by an additive manufacturing process that can fold upon, or following, exposure to an external stimulus.
Figure 3B:
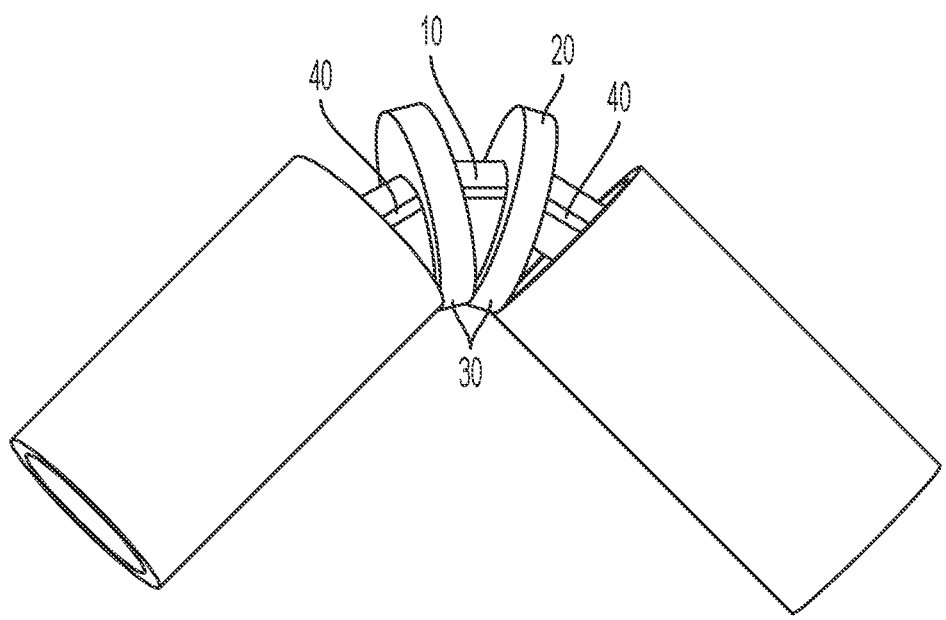
FIG. 3B is a computer generated model of an object formed by an additive manufacturing process that has folded after exposure to an external stimulus.
Figure 4A:
FIG. 4A is a top view of a schematic representation of an arrangement that can produce a folding transformation upon, or following, exposure to an external stimulus.
Figure 4B:
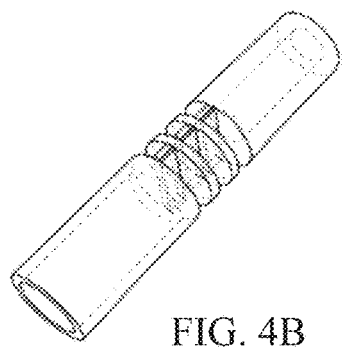
FIG. 4B is a perspective view of a schematic representation of an arrangement that can produce a folding transformation upon, or following, exposure to an external stimulus.
Figure 4C:
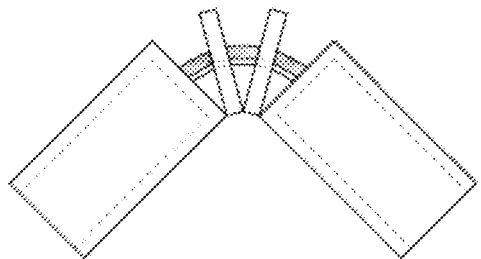
FIG. 4C is a top view of a schematic representation of an arrangement that has undergone a folding transformation after exposure to an external stimulus.
Figure 4D:
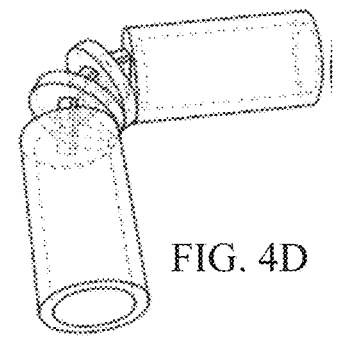
FIG. 4D is a perspective view of a schematic representation of an arrangement that has folded after exposure to an external stimulus.
Figure 4F:
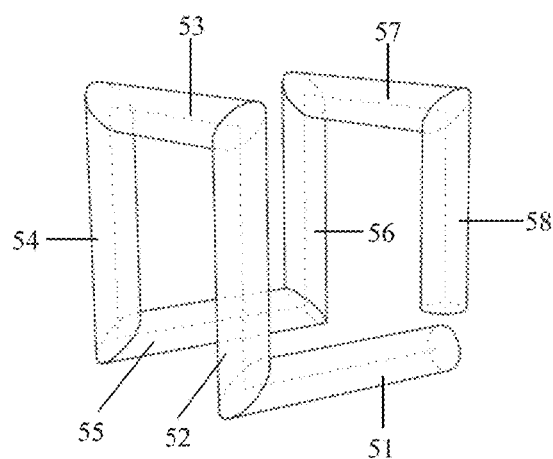
FIG. 4F is a perspective view of a schematic representation of an arrangement having a plurality of joints that has folded to form a Hilbert curve in the shape of a cube after exposure to an external stimulus.
Figure 4E:
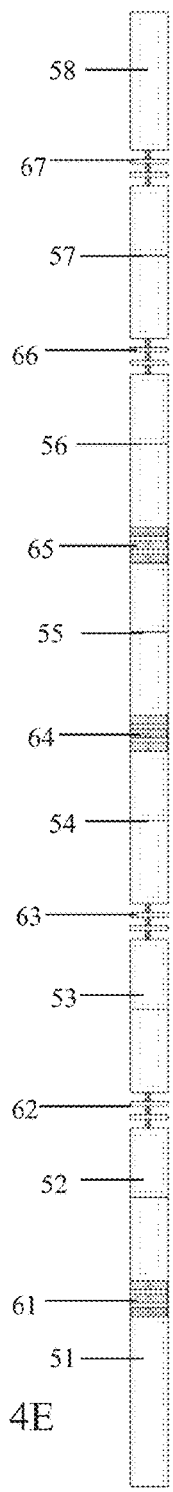
FIG. 4E is a top view of a schematic representation of an arrangement having a plurality of joints that can fold to form a Hilbert curve in the shape of a cube upon, or following, exposure to an external stimulus.

FIGS. 3A and 3B are computer generated models of an object formed by an additive manufacture process that can fold upon, or following, exposure to an external stimulus. FIG. 3A is a drawing of the object prior to exposure to an external stimulus, and FIG. 3B is a drawing of the object after exposure to an external stimulus. In this particular embodiment, the high swelling material 10 is more hydrophilic than the low swelling material 20, and the external stimulus is exposure to water. As shown in FIG. 3B, the high swelling material has expanded in size relative to the low swelling material, causing a predicted bend in the joint.

FIGS. 4A-F are schematic representations of an arrangement of folding joints that can form a cube. The cube is formed from a series of joints similar to those shown in FIGS. 2, 3A, and 3B. The edges of the cube are formed from low swelling cylindrical material 51-58. The joints 61-67 are orientated so that the generally cylindrical shape transforms into a cube. For example, joint 62 is rotated 90° relative to joint 61 in order to align the cylindrical materials 51-58 to form the edges of a cube.

Figure 5:
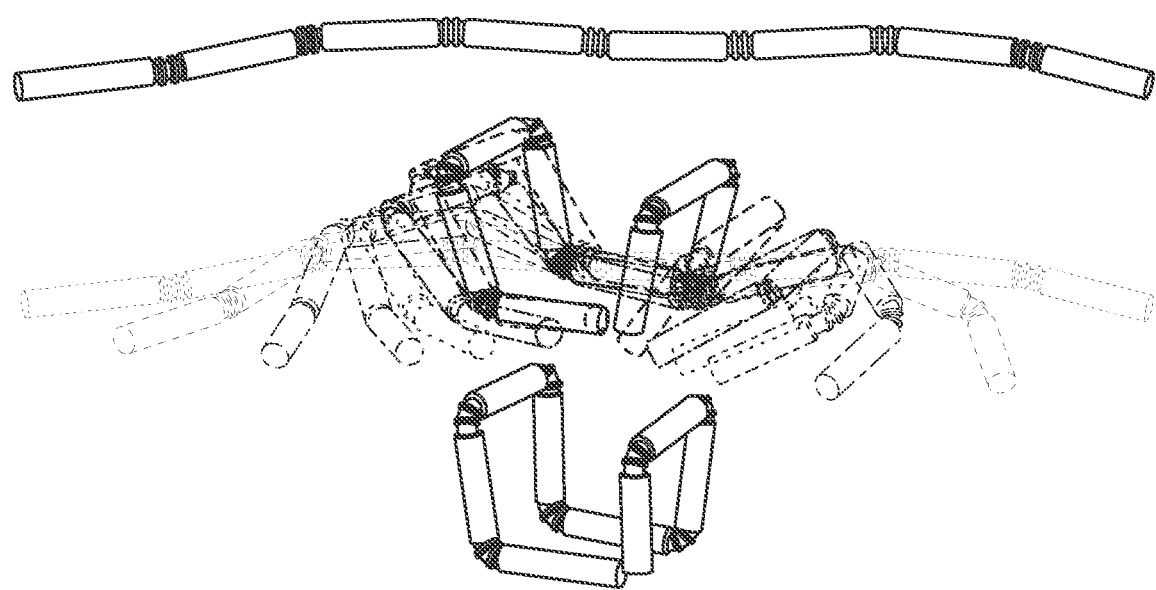
FIG. 5 is a series of time-lapsed line drawings showing a transformation from a cylindrical object to a Hilbert curve in the shape of a cube.

FIG. 5 is a series of time-lapsed line drawings showing a transformation from a cylindrical object to a cube. The top image shows the generally cylindrical first shape of the object. As printed in a first shape, the object is approximately 18 inches long. The middle image shows several superimposed line drawings that illustrate the predicted change of the object over time. The bottom image is a line drawings of the object after the transformation has been completed. Geometrically, the cube is the first generation of a fractal Hilbert curve, where a single line is drawn through all eight points of the cube without overlapping or intersecting. In this particular example, the low swelling material was OBJET® VeroBlackPlus™ RGD875, and the high swelling material was a formulation of the hydrophilic type described in Tables 1 or 2. The object was immersed in hot water for approximately 15 to 30 minutes.

One of skill in the art will understand that the timeframe of the transformation from a first shape to a second shape can depend on a variety of factors. Increasing the solvent temperature can decrease the amount of time required for the transformation. For example, a similar transformation as in FIG. 5 using cold water can require one hour or longer. In some cases, the transformation upon exposure to water can be reversible or partially reversible. Removing the object from the water after it has transformed to the second shape can cause it to revert back to the first shape. However, the object may not be completely straight, and for this reason it may only partially reverse to the first shape.

Example 2: Transformation from a Cylinder to Letters

In this example, a generally cylindrical object transforms into a series of letters that spell "MIT."

Figure 6:
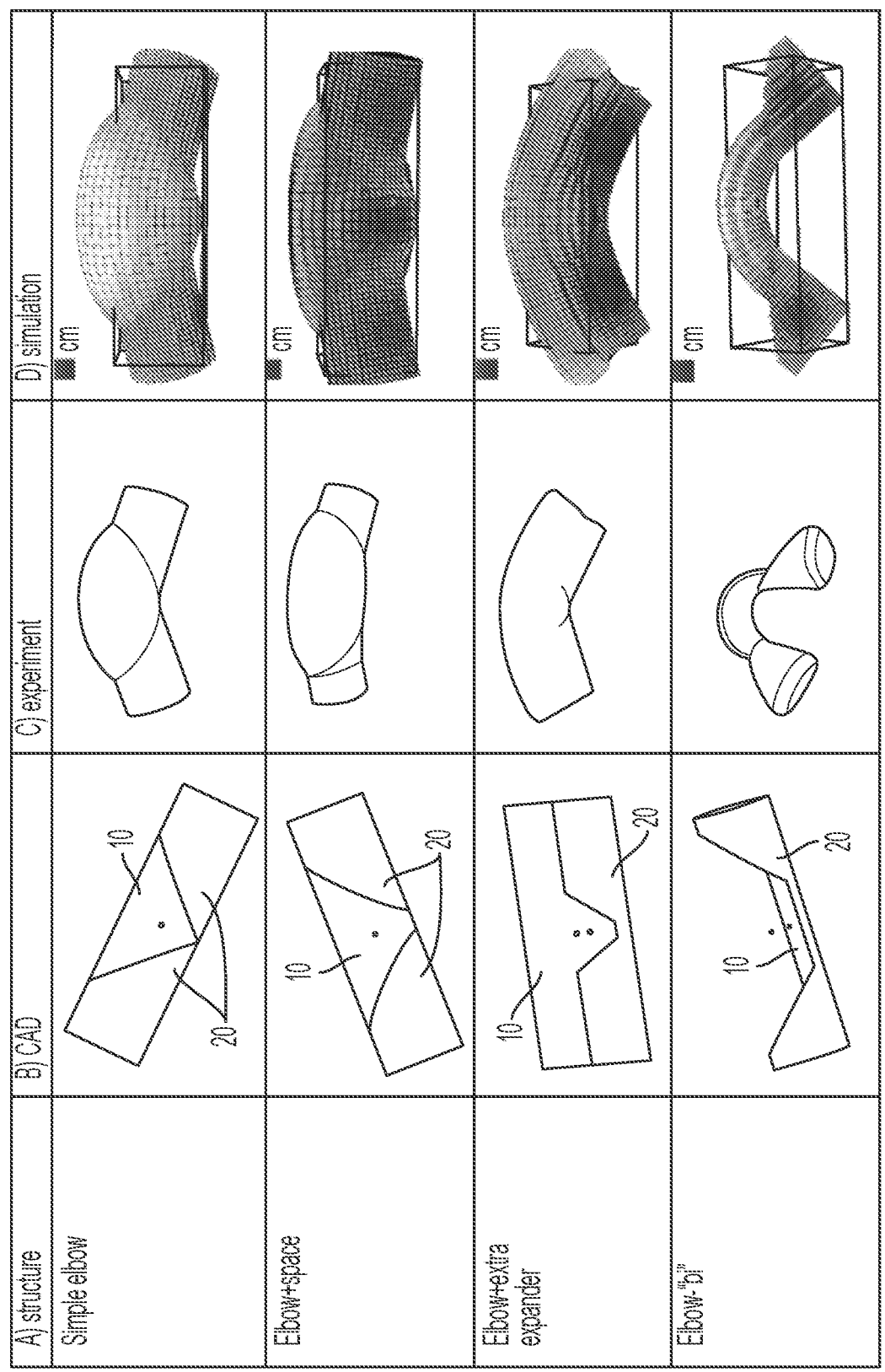
FIG. 6 is a table having four columns that: a) describe a type of joint; b) provide a computer aided design (CAD) of the joint; c) show a line drawing of an experimental representation of the joint after exposure to an external stimulus; and d) illustrate a simulation showing the predicted shape of the joint after exposure to an external stimulus.

FIG. 6 is a table having four columns that: A) describe a type of joint; B) provide a computer aided design (CAD) of the joint; C) show a line drawing of an experimental representation of the joint after exposure to an external stimulus; and D) illustrate a simulation showing the predicted shape of the joint after exposure to an external stimulus. Each of the joints in FIG. 6 can be used to curve an object of additive manufacture upon exposure to an external stimulus. Each of the joints has a different arrangement of high swelling material 10 and low swelling material 20, and thus each joint curves differently, as are illustrated in the experimental and simulated curvature (columns C and D). The joint designated Elbow-"bi" is particularly effective for creating larger curvatures, though each of the joints listed, as well as modifications and hybrids thereof, can provide suitable curvature. In the VoxCAD simulation, the low swelling material was assigned a modulus of 2 GPa and a thermal expansion of zero. The high swelling material was assigned a modulus of 100 MPa and a thermal expansion of $0.03° C.^{-1}$. Water expansion was simulated by increasing the temperature to 50° C. In general, all of the joints illustrated in FIG. 6 are folding joints, though each folds slightly differently.

Figures 7A, 7B:
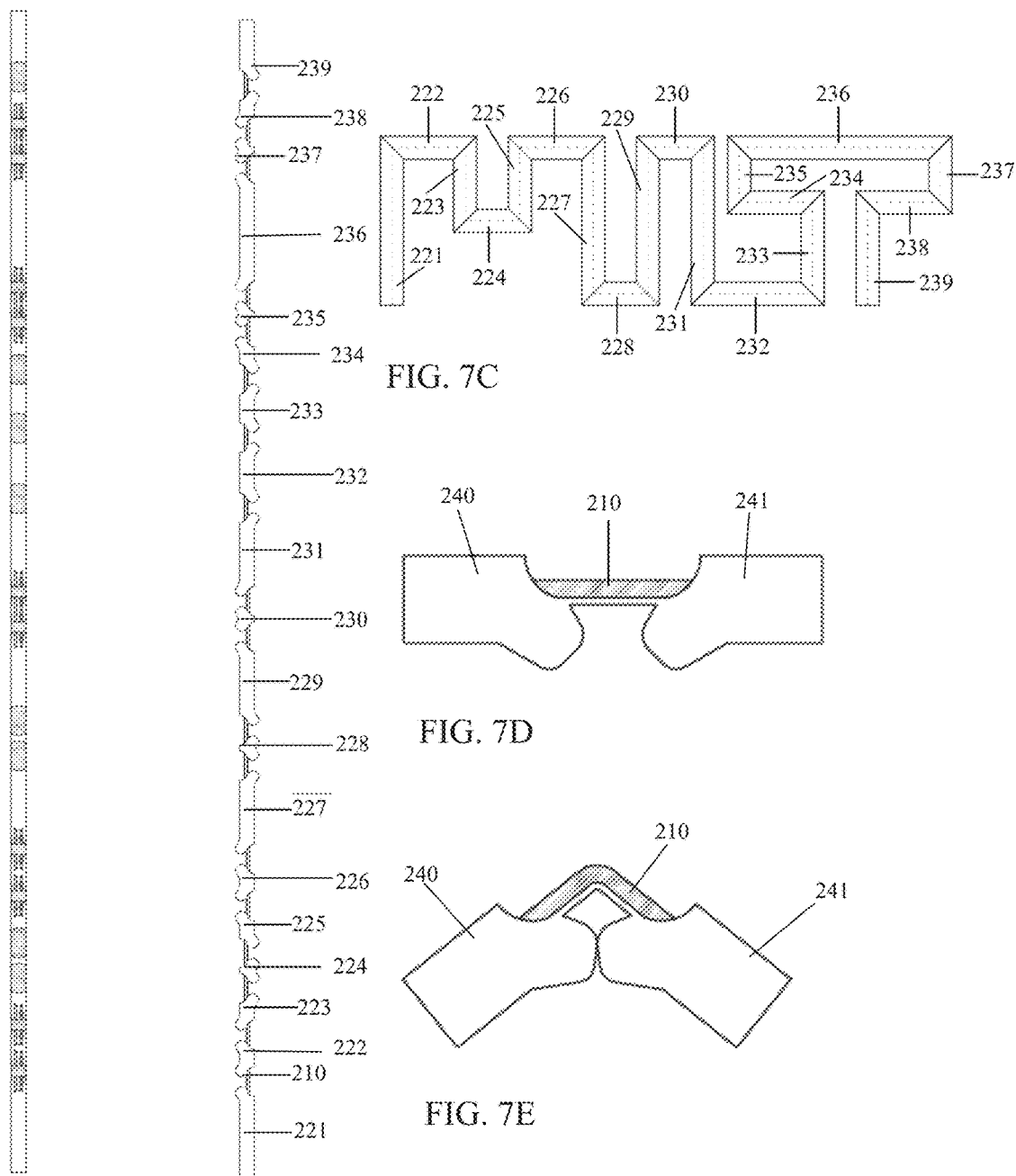
FIG. 7A is a top view of a schematic representation of an arrangement of a generally cylindrical object having a series of joints that can transform into an object that spells the letters "MIT."
FIG. 7B is a side view of a schematic representation of an arrangement of a generally cylindrical object having a series of joints that can transform into an object that spells the letters "MIT."

FIGS. 7A and 7B are schematic representations of an arrangement of a generally cylindrical object having a series of joints that can transform into an object that spells the letters "MIT." FIG. 7A is a top view, and FIG. 7B is a side view. The letters are formed from low swelling material 221-239 with intervening high swelling material 210. Upon exposure to an external stimulus, the high swelling material 210 expands, and the curved corners of the low swelling materials 221-239 are forced together to form joints, thereby resulting in the schematic representation shown in FIG. 7C, which spells the letters "MIT."

FIG. 7D is a schematic illustrating an example joint having low swelling materials 240 and 241 with intervening high swelling material 210. Upon exposure to an external stimulus, the high swelling material expands, and the two low swelling materials 240 and 241 are forced toward each other, resulting in the joint illustrated in FIG. 7E. The relative curvature near the point of contact between the two low swelling materials 240 and 241 causes a predicted folding at the joint. By appropriately orientating the low swelling materials 221-239, an object can be created that predictably curves in 90° angles in both the clockwise and counterclockwise directions.

FIGS. 8A-D is a series of time-lapsed line drawings showing a transformation from a generally cylindrical object to an object that spells the letters "MIT." The object corresponds to that illustrated in FIGS. 7A-E. FIG. 8A shows the generally cylindrical first shape of the object. As printed in a first shape, the object is approximately one foot long. FIG. 8B shows several superimposed line drawings that illustrate the predicted change of the object over time. FIG. 8C is a line drawing of the object after the transformation has been completed. FIG. 8D is a series of non-superimposed line drawings showing the predicted change of the object over time. In this particular example, the low swelling material was OBJET® VeroBlackPlus™ RGD875, and the high swelling material was a formulation of the hydrophilic type described in Tables 1 or 2. The object was immersed in hot water for approximately 15 to 30 minutes.

Example 3: Formation of a Cube with Solid Sides

This example demonstrates surface transformations. A two-dimensional flat plane was printed. The flat plane corresponds to the six unfolded surfaces of a cube. At each of the joints, a strip of high and low swelling material is arranged so that the object transforms from a first shape to a second shape upon exposure to an external stimulus. The arrangement of high and low swelling material at each joint enables a 90° curvature so that the faces of the cube curve toward each other and stop curving upon reaching the second, predetermined shape. When submerged in water, the first shape transforms into a closed surface cube with filleted edges.

FIGS. 9A-F are schematic representations of an object of additive manufacture that can transform into a cube having solid sides after exposure to an external stimulus. FIG. 9A is a top view of the object, which is formed from six panels 320, one for each face of the cube, with joints that fold upon exposure to an external stimulus. In the embodiment shown in FIGS. 9A-F, each joint has four rectangular members 330. While the embodiment shown has four rectangular members, the joint can have greater or fewer rectangular members. The panels 320 and rectangular members 330 are formed from a low swelling material. Each of the joints is characterized by high swelling material 310 that connects the adjacent rectangular members 330. FIGS. 9B and 9D are schematic illustrations of two panels 320 having a joint that can fold upon exposure to an external stimulus. FIGS. 9C and 9E are schematic illustrations of two panels 320 having a joint that has folded after exposure to an external stimulus. FIG. 9F is a schematic illustration of the object of additive manufacture illustrated in FIG. 9A after exposure to an external stimulus.

Figure 10A:
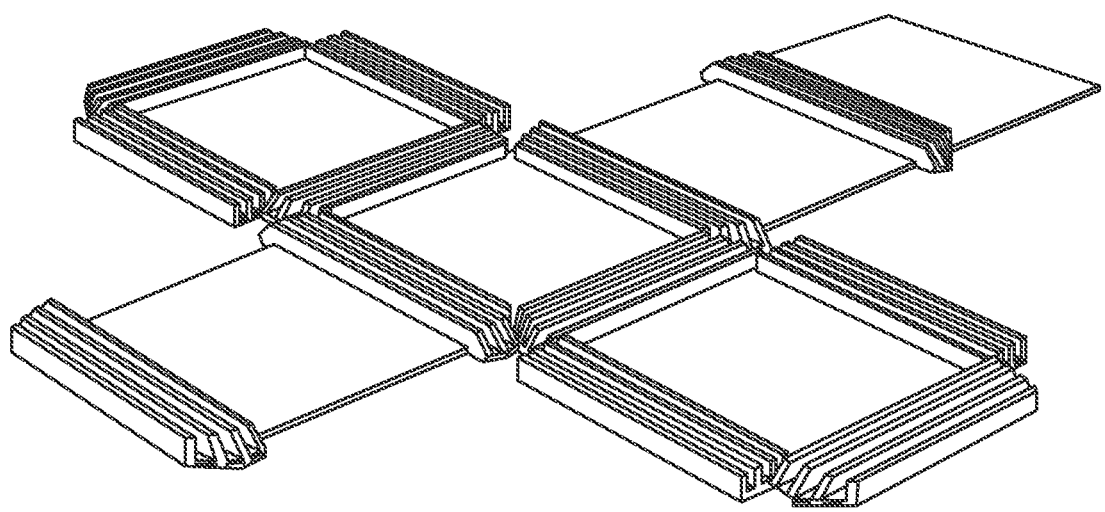
FIG. 10A is a computer generated model of an object formed by an additive manufacturing process that can transform into a cube upon, or following, exposure to an external stimulus.
Figure 10B:
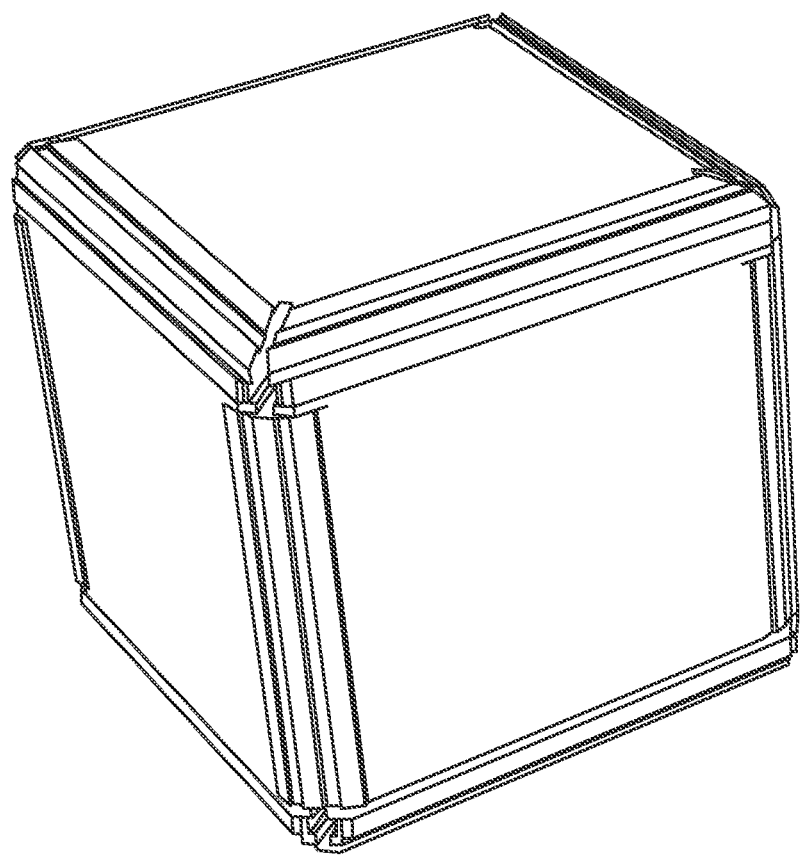
FIG. 10B is a computer generated model of an object formed by an additive manufacturing process that has transformed into a cube after exposure to an external stimulus.
Figure 11A:
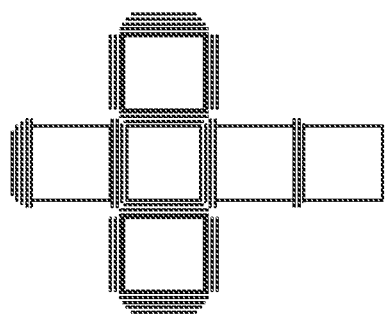
FIGS. 11A-D are a series of time-lapsed line drawings showing a transformation of an object formed by an additive manufacturing process into a cube upon, or following, exposure to an external stimulus.
Figure 11B:
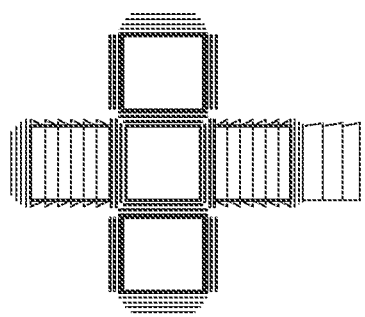
Figure 11C:
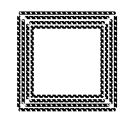
Figure 11D:
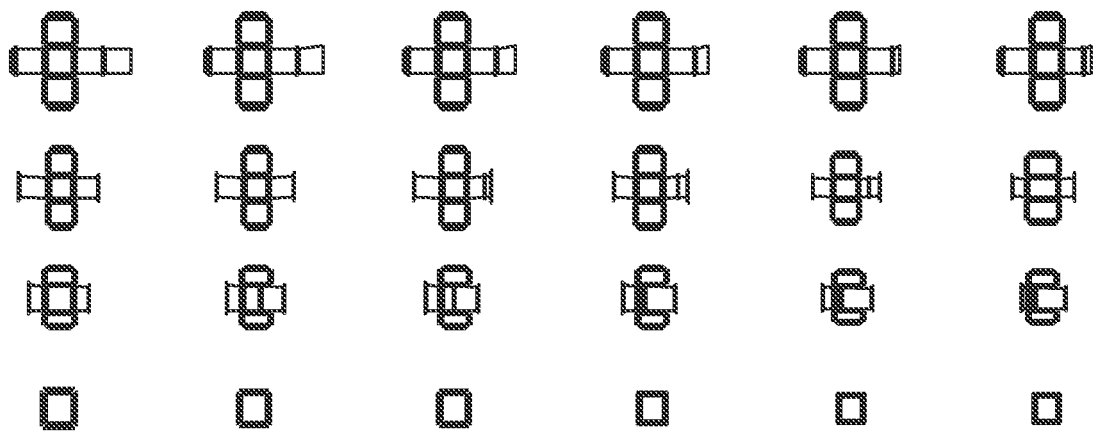

FIG. 10A is a computer-generated model of an object formed by an additive manufacturing process that can transform into a cube upon exposure to an external stimulus. FIG. 10B is a computer-generated model of the object of FIG. 10A that has transformed into a cube after exposure to an external stimulus. FIG. 11A is a line drawing of the object of additive manufacture of FIG. 10A. FIG. 11B shows several superimposed line drawings that illustrate the predicted change of the object over time. FIG. 11C is a line drawing of the object after the transformation has been completed. FIG. 11D is a series of non-superimposed line drawings showing the predicted change of the object over time. In this particular example, the low swelling material was OBJET® VeroBlackPlus™ RGD875, and the high swelling material was a formulation of the hydrophilic type described in Tables 1 or 2.

Example 4: Linear Elongation

In this example, the linear elongation of a hollow cylinder is demonstrated.

Figure 12A:
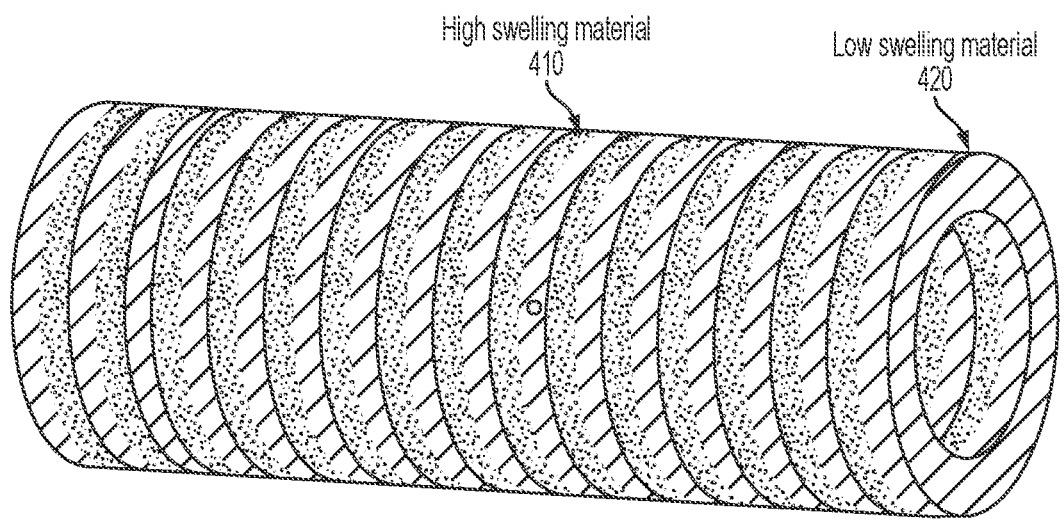
FIG. 12A is a schematic representation of an arrangement of joints that can effect linear elongation.

FIG. 12A is a schematic representation of an arrangement of joints that can effect linear elongation. In the embodiment shown, the object is shaped to form a hollow cylinder. The object has alternating rings of high swelling material 410 and low swelling material 420. Upon exposure to an external stimulus, the high swelling material 410 expands, and the net effect is that the hollow cylinder expands along its longitudinal axis. In this particular example, the low swelling material was OBJET® VeroBlackPlus™ RGD875, and the high swelling material was a formulation of the hydrophilic type described in Tables 1 or 2.

Figure 12B:
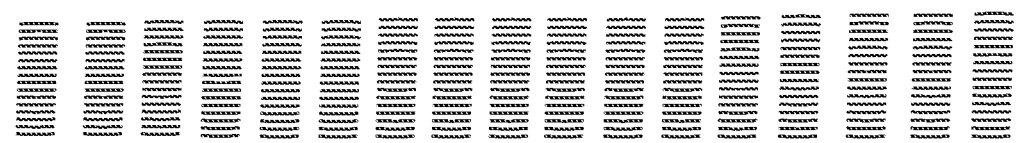
FIG. 12B is a line drawing of an object of additive manufacture having an arrangement of joints that can effect linear elongation.

FIG. 12B is a line drawing of an object of additive manufacture that is similar to the schematic representation of FIG. 12A. The line drawings depict the linear elongation of the object of additive manufacture upon exposure to an external stimulus.

Example 5: Curved Crease #1

In this example, a thin disc undergoes a curling transformation.

Figure 13A:
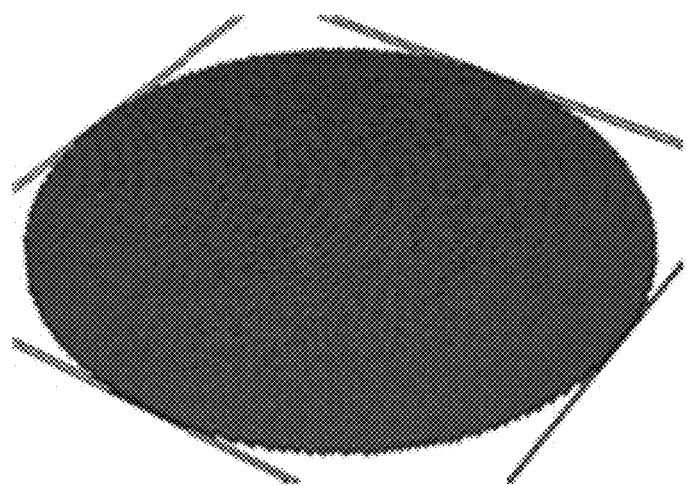
FIG. 13A is a schematic representation of an object formed by an additive manufacturing process that can undergo a curling transformation upon, or following, exposure to an external stimulus.

FIGS. 13A-D depict an object of additive manufacture that undergoes a curling transformation upon, or following, exposure to an external stimulus. FIG. 13A is a schematic representation of an object formed by an additive manufacturing process that can undergo a curling transformation upon, or following, exposure to an external stimulus. The center of the object is a low swelling material (depicted in red) while the periphery is a high swelling material (depicted in purple). The object is formed with a gradient in the distribution of material from the center to the periphery. Manufacturing an object with a gradient in the material distribution is particularly difficult to achieve through conventional, subtractive manufacturing processes.

Figure 13B:
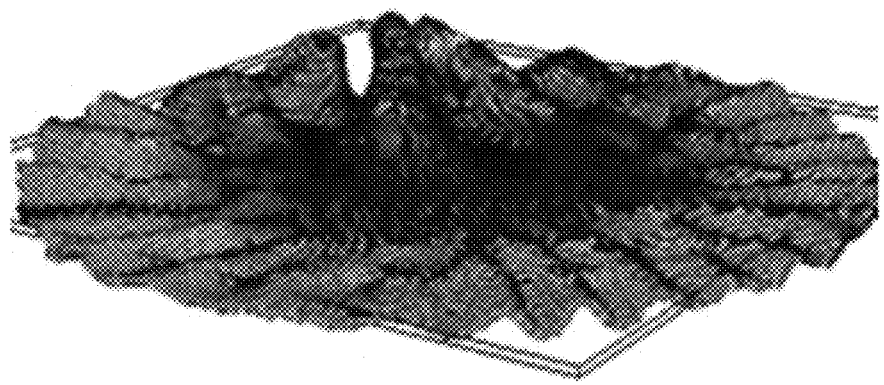
FIG. 13B is a simulation showing the predicted shape of the object of FIG. 13A after exposure to an external stimulus.
Figure 13C:
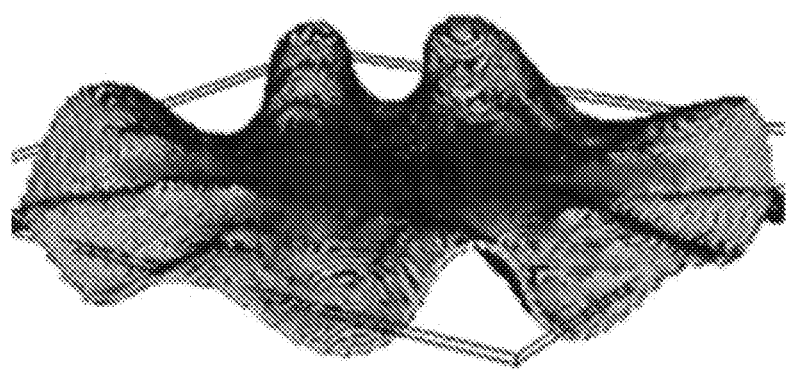
FIG. 13C is a simulation showing the predicted shape of the object of FIG. 13A after exposure to an external stimulus.

FIGS. 13B and 13C are simulations showing the predicted shape of the curling of FIG. 13A after exposure to an external stimulus. The difference between FIGS. 13B and 13C is that FIG. 13B is a simulation at a shorter duration of time after exposure to an external stimulus than FIG. 13C.

Figure 13D:
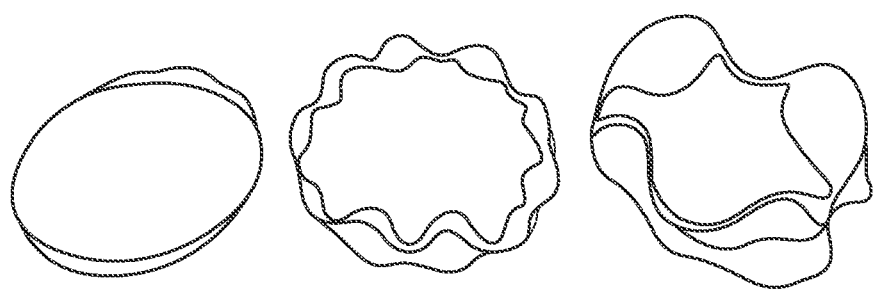
FIG. 13D is a series of line drawings of an object formed by an additive manufacturing process at various times before and after exposure to an external stimulus. The line drawings show an object that can undergo an curling transformation upon, or following, exposure to an external stimulus.

FIG. 13D is a line drawing of an object formed by an additive manufacturing process that can undergo a curling transformation upon, or following, exposure to an external stimulus. The image on the left is the initial shape of the object as printed. The image in the middle is the object after exposure to water for 30 minutes. The image on the right is the object after exposure to water for 4 hours. In the later stages of deformation, the initial symmetry was broken, and a wavy circumference shape was attained. This transformation is generally referred to as a curved crease. In this particular example, the low swelling material was OBJET® VeroBlackPlus™ RGD875, and the high swelling material was a formulation of the hydrophilic type described in Tables 1 or 2.

Thus, FIGS. 13A-D illustrate that complex distributions of low and high swelling material can generate complex distortion behavior.

Example 6: Hole Closure

Figure 17:
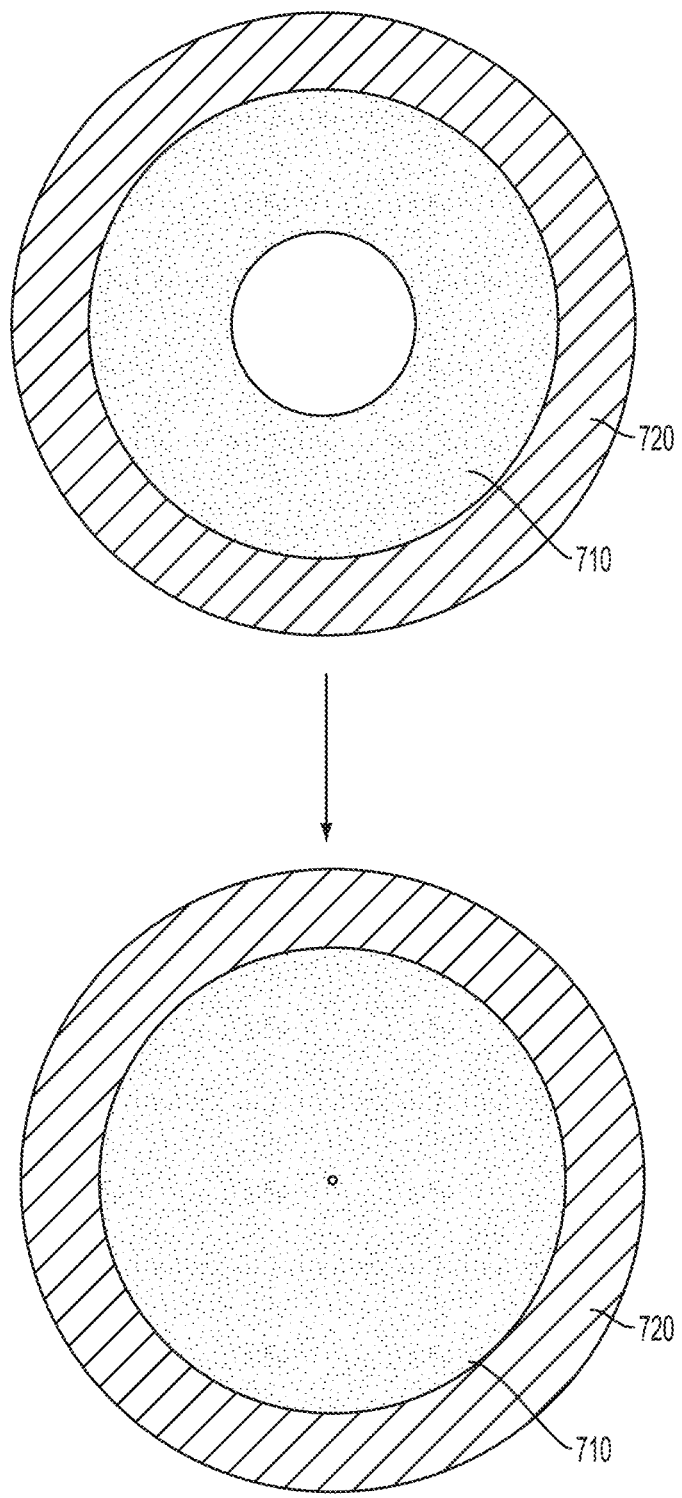
FIG. 17 is a schematic representation of an arrangement of materials that can undergo a hole closing transformation.

This example describes a self-healing structure, wherein a hole or lumen decreases in size upon exposure to an external stimulus. As illustrated in FIG. 17, a cylindrical object can be printed having a high swelling material 710 deposited in the interior and a low swelling material 720 on the exterior. Upon exposure to an external stimulus, the high swelling material 710 in the interior of the cylinder expands to decrease the diameter of the hole 730.

In a first iteration of this example, the low swelling material 720 can be relatively rigid, and the high swelling material 710 can be a soft elastomer or elastomer-like material (e.g., polymerized OBJET® TangoPlus™ FLX930 material). The external stimulus can be a change in pressure, which causes the high swelling material 710 to expand and decrease the volume of the lumen.

In a second iteration of this example, the low swelling material 720 can be OBJET® VeroBlackPlus™ RGD875, and the high swelling material can be a formulation of the hydrophilic type described in Tables 1 or 2. The external stimulus can be exposure to water, which causes the high swelling material 710 to expand and decrease the volume of the lumen.

In a third iteration of this example, the low swelling material 720 can be relatively rigid that does not change shape appreciably upon exposure to electromagnetic energy (e.g., light), and the temperature of the high swelling material 710 can increase upon exposure to electromagnetic energy (e.g., light). The high swelling material 710 can then expand similarly to the temperature-response embodiment described below in reference to Example 8. For example the low swelling material 720 can be a clear plastic that allows light to penetrate.

Example 7: Three Material Systems

In another embodiment, first and second additive manufacturing materials are low swelling materials having different rigidity that are arranged relative to a third, high swelling additive manufacturing material. The amount of deformation can be adjusted by altering the relative amounts of the first and second low swelling materials. As illustrated in FIGS. 15A and 15B, a high swelling material 610 can be printed adjacent to a first low swelling material 620, which, in turn, is printed adjacent to a second low swelling material 630. The relative thickness of the first and second low swelling materials 620 and 630 can be adjusted to control the amount of deformation. In one particular embodiment, the first low swelling material 620 can have a lower rigidity than the second low swelling material 630. Using a thicker layer of the second low swelling material 630 that has a higher rigidity or a thinner layer of the first low swelling material that has a lower rigidity, or both as illustrated, can decrease the amount of deformation. Increasing the thickness of the high swelling material 610 can also have the same effect. The technique is not limited to only three materials, but rather any particular number of low and/or high swelling materials can be printed, such as three, four, five, or more. In another particular embodiment, the first low swelling material 620 can have a higher rigidity than the second low swelling material 630. In other embodiments, the relative positions of the high swelling material 610, the first low swelling material 620, and the second low swelling material 630 can be adjusted. For example, the first low swelling material 620 can be on top, the high swelling material 610 can be in the middle, and the second low swelling material 620 can be on the bottom.

Example 8: Temperature-Based Transformation

Figure 16A:
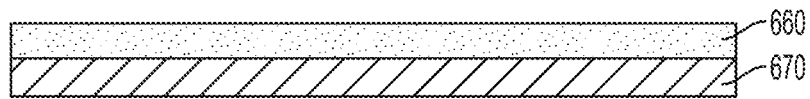
FIGS. 16A-C are schematic representations of an arrangement of materials that can be used in a temperature-based system.
Figure 16B:
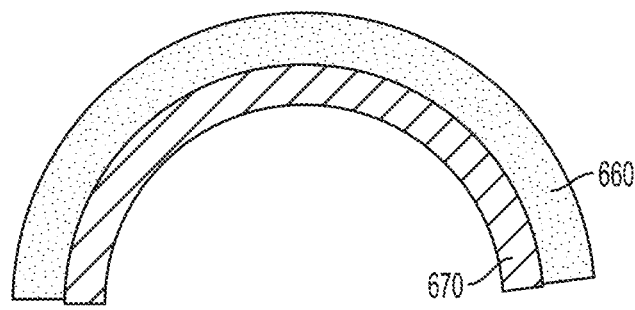
Figure 16C:

FIGS. 16A-C illustrate an object of additive manufacture for use in a temperature-based transformation. An object having a shape can be printed from two additive manufacturing materials, a high swelling material 660 and a low swelling material 670, as illustrated in FIG. 16A. The shape can be immersed in hot water and deformed to yield the object of FIG. 16B, which is then cooled and dried at ambient temperature to yield a cool, dry, deformed shape. The shape is then exposed to heat, which causes the shape to revert to the originally printed shape, as illustrated in FIG. 16C.

Several different types of 3D printable materials are suitable. Typically, the material is rigid below its glass transition temperature (Tg) but soft and flexible above its Tg. One particular material is the OBJET® VeroWhitePlus™ RGD835 (Stratasys Ltd., Israel), which is rigid and stiff at room temperature but very soft and flexible at 90° C. As another example, the OBJET® DurusWhite™ RGD30 material (Stratasys Ltd., Israel) is rigid and stiff at room temperature but very soft and flexible at 75° C. In one embodiment, the Tg can range from approximately 75° to approximately 90° C. One of skill in the art will recognize, however, that the Tg is not restricted to the range of approximately 75° C. to approximately 90° C. Rather, a wide variety of thermosetting plastics are suitable, and the Tg can be any temperature that is suitable for the particular application, e.g., approximately 0° C. to approximately 150° C.

Example 9: Curved Crease #2

This example describes a curved crease formation.

An object of additive manufacture can be printed in a first shape. The first shape is generally annular. The first shape is printed with concentric, alternating rings of high swelling and low swelling material.

Figure 18A:
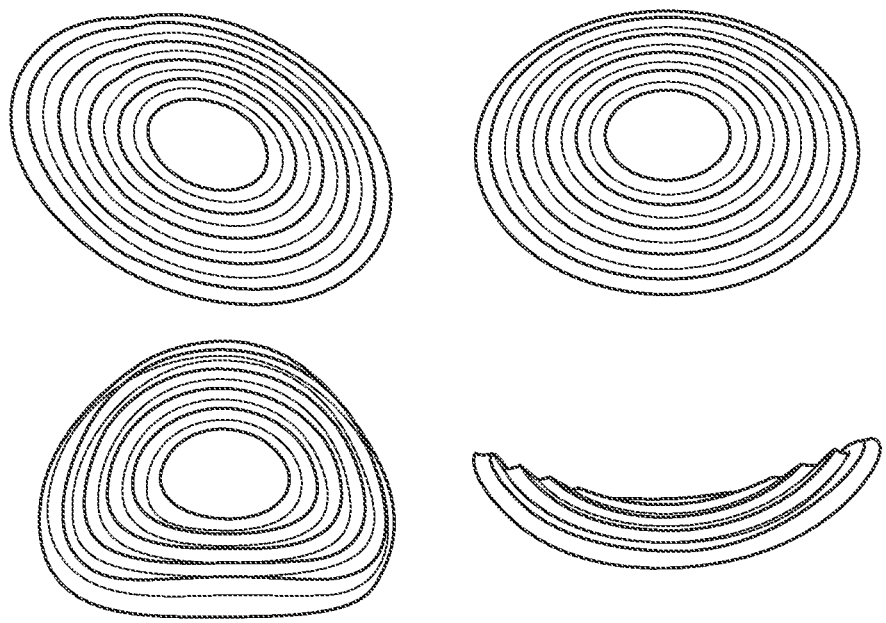
FIG. 18A is four line drawings of an object of additive manufacture that can undergo a curved crease transformation.
Figure 18B:
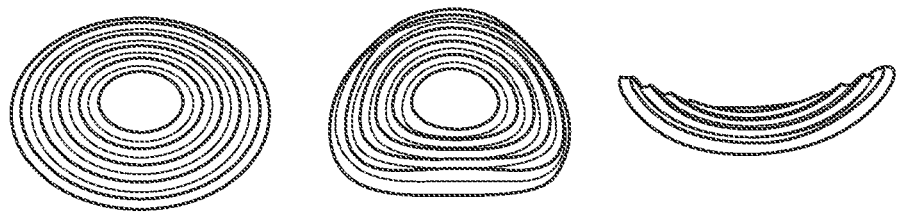
FIG. 18B is three line drawings of an object of additive manufacture that can undergo a curved crease transformation.

The top two line drawings of FIG. 18A illustrate the generally annular shape and concentric, alternating rings of high and low swelling material. The bottom two line drawings of FIG. 18A illustrate the object after exposure to an external stimulus. As can be seen, the object develops a wavy curve that is generally referred to as a curved crease. FIG. 18B is additional line drawings of the same object of FIG. 18A.

Example 10: Octahedron

This example describes the formation of an octahedron.

Figure 19:
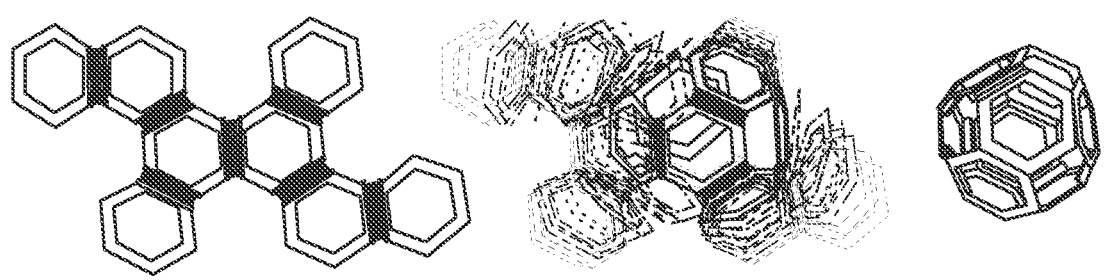
FIG. 19 is three line drawings of an object of additive manufacture that can transform into an octahedron.

FIG. 19 is a series of line drawings of an object of additive manufacture that can fold to form an octahedron. The line drawing on the left illustrates the object as printed. The line drawing in the middle is a series of superimposed time-lapsed line drawings showing the transformation from the printed shape into an octahedron upon exposure to an external stimulus. The line drawing on the right is the object after exposure to an external stimulus and shows the complete transformation to an octahedron.

Example 11: Joint Spacing

Figure 20:
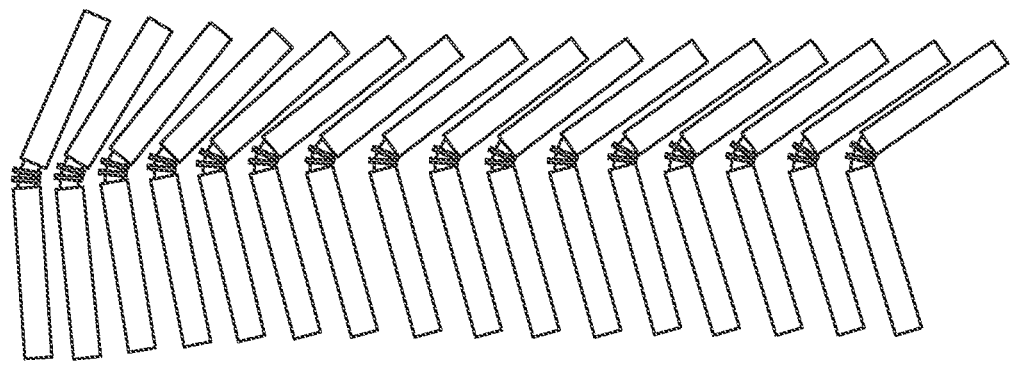
FIG. 20 is a series of line drawings showing folding joints having differentially-spaced cylindrical discs.

FIG. 20 is a series of line drawings of joints having differentially-spaced discs. The joints on the left side of the line drawings have cylindrical discs that are more closely spaced together, while the joints on the right side of the line drawing have joints that are spaced farther apart. The joints having more closely spaced cylindrical discs do not fold as much as the joints having greater spacing between the cylindrical discs.

Figure 21:
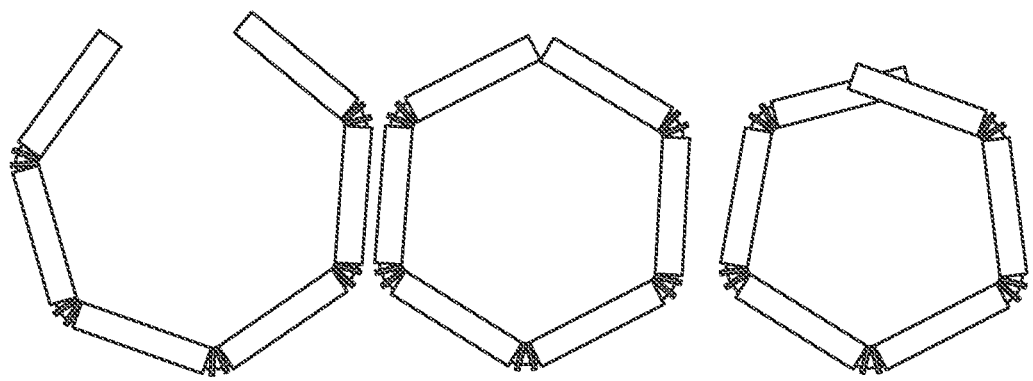
FIG. 21 is a series of line drawings showing folding joints having differentially-spaced cylindrical discs.

FIG. 21 is another series of line drawings of joints having differentially-spaced discs. The joints on the left side of the line drawing have cylindrical discs that are more closely spaced together, while the joints on the right side of the line drawing have joints that are spaced farther apart. The joints having more closely spaced cylindrical discs do not fold as much as the joints having greater spacing between the cylindrical discs.

While the spacing is illustrated with respect to joints having a cylindrical disc, one of skill in the art will understand that the principle is similarly applicable to joints having rectangular members, such as those described in FIGS. 9A-F, 10A-B, and 11A-D.

Example 12: Linear Expander

This example describes the formation of a linear expander.

Figure 22A:
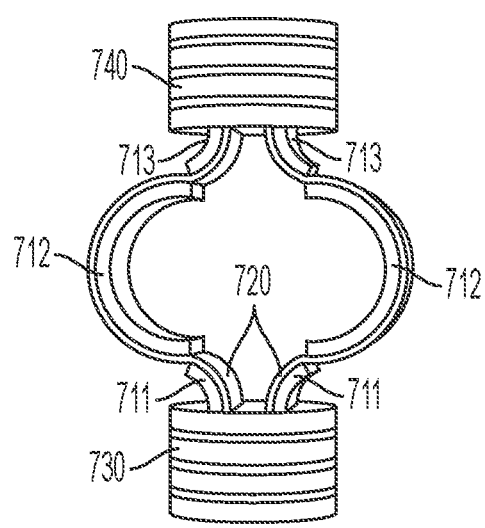
FIG. 22A is a computer generated model of a linear expander formed by an additive manufacturing process that can expand upon, or following, exposure to an external stimulus.
Figure 22B:
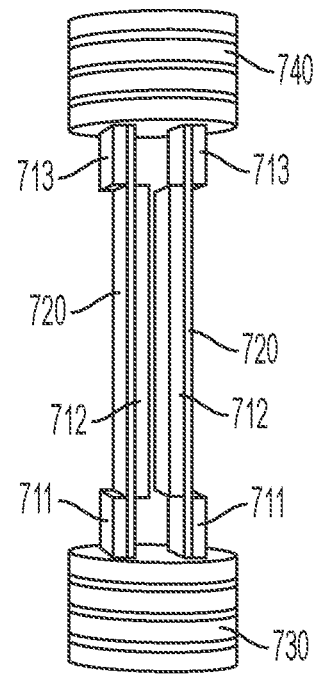
FIG. 22B is a computer generated model of a linear expander formed by an additive manufacturing process that has expanded upon exposure to an external stimulus.

FIG. 22A is a schematic representation of a linear expander as formed by an additive manufacturing process. The linear expander has a first end portion 730 and a second end portion 740 that are formed, at least partially, of a low swell material. The first and second end portions 730 and 740 are connected via two low swell portions 720 that have curves that are mirror images of each other. The low swell portion 720 on the left travels upwards from the first end portion 730, curves counterclockwise for approximately 90°, then curves clockwise for approximately 180°, then curves counterclockwise for approximately 90°. The low swell portion 720 on the left has three distinct adjacent high swell portions 711, 712, and 713. The high swell portion 711 is affixed on the lower, exterior portion of the low swell material curve. The high swell portion 712 is affixed on the middle, interior portion of the low swell material 720. The high swell portion 713 is affixed on the upper, exterior portion of the low swell material 720. The low swell portion 720 on the right travels along a trajectory that is a mirror image of low swell portion 720 on the left, and the high swell portions on the right are similarly mirror images. Upon exposure to an external stimulus, the high swell portions 711, 712, and 713 expand, causing the linear expander of FIG. 22A to transform into the linear expander of FIG. 22B. In other words, the linear expansion joint has portions connected by an arrangement of low and high swelling materials that form curling joints, the synergistic effect of which is to provide linear expansion.

Figure 22C:
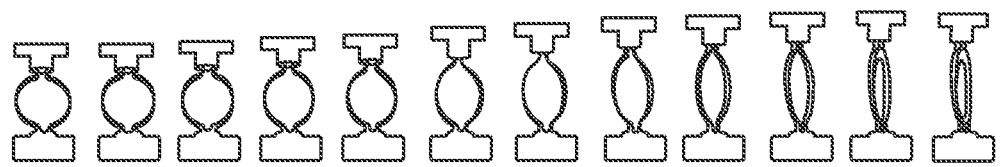
FIG. 22C is a series of line drawings showing the transformation of a linear expander upon exposure to an external stimulus.

FIG. 22C is a series of time-lapsed line drawings showing the transformation of a linear expander from a first shape to a second, predetermined shape upon exposure to an external stimulus.

Example 13: Curling

This example describes the formation of a curling joint.

Figure 23A:
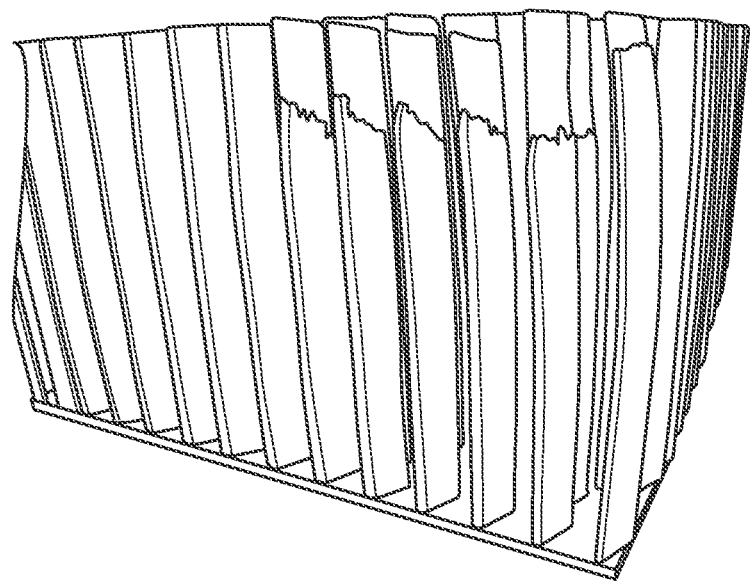
FIGS. 23A-C are line drawings showing curling.
Figure 23B:
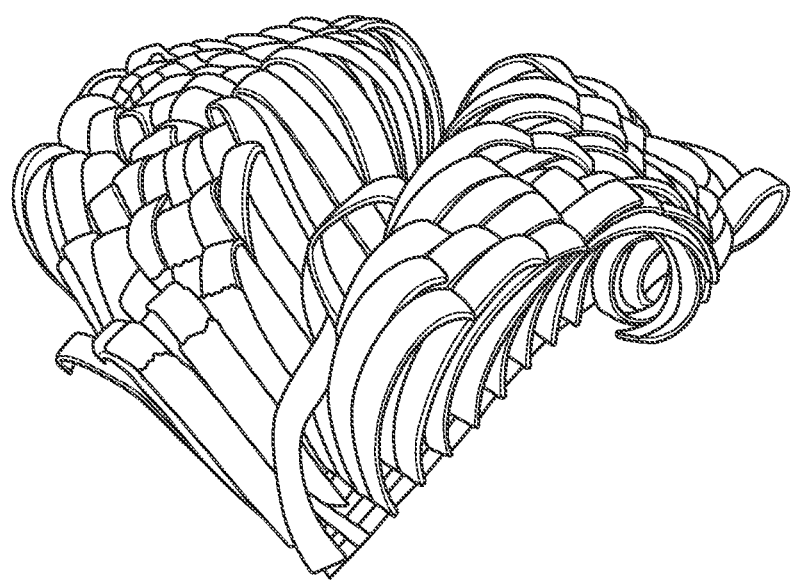
Figure 23C:
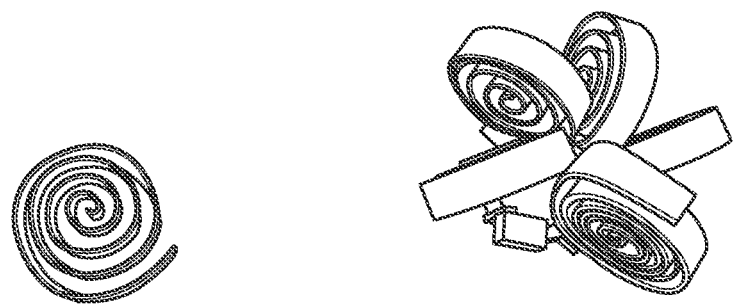

FIGS. 23A-C are line drawings of an object of additive manufacture that can curl upon, or following, exposure to an external stimulus. In these particular examples, an object of additive manufacture is formed having a low swelling layer adjacent to a high swelling layer. Upon, or after, exposure to an external stimulus, the object will curl away from the high swelling material (i.e., the low-swelling material will be on the inside of the curl).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for additive manufacturing of an object, the method comprising:
   dispensing a multiplicity of layers of a first polymerizable formulation from a three-dimensional printer, the first polymerizable formulation being a first additive manufacturing material;
   dispensing a multiplicity of layers of a second polymerizable formulation from a three-dimensional printer, the second polymerizable formulation being a second additive manufacturing material;

wherein post-polymerization and in response to an external stimulus, the second polymerizable formulation is lower swelling than the first polymerizable formulation;

the first and second additive manufacturing materials arranged relative to each other to form first and second joints in series that enable a predicted transformation of the object from a first manufactured shape to a second manufactured shape in response to an external stimulus, the external stimulus being non-biasing with respect to the predicted transformation from the first manufactured shape to the second manufactured shape;

wherein for each of the first and second joints, the second additive manufacturing material is arranged to form a planar member within the joint, at least two members that extend outward from the joint, and at least two members within the joint that contact each other during the predicted transformation to restrict degree of curvature of the joint;

wherein for each of the first and second joints, the first additive manufacturing material is arranged on the planar member of the joint; and wherein the planar members of the first and second joints are not parallel to each other.

2. The method of claim 1, wherein the second additive manufacturing material has a glass transition temperature of approximately 0° C. to approximately 150° C.

3. The method of claim 2, further comprising exposing the object to an external stimulus, wherein the external stimulus is a temperature change.

4. The method of claim 1, wherein the external stimulus is a first external stimulus and wherein the second additive manufacturing material has a second response to either the first external stimulus or to a second external stimulus to enable a corresponding second predicted transformation of the object to a third manufactured shape.

5. The method of claim 4, further comprising dispensing a third additive manufacturing material arranged relative to the first or second additive manufacturing materials, or both, and having a third response to the first external stimulus, the second external stimulus, or a third external stimulus to enable a corresponding third predicted transformation of the object to a fourth manufactured shape.

6. The method of claim 5, wherein the third response modifies properties of one or more of the first or second additive manufacturing materials.

7. The method of claim 6, wherein the property modified is stiffness of one or more of the first and second additive manufacturing materials.

8. The method of claim 1, wherein each joint is a means for effecting rotational displacement of a first member that extends outward from the joint relative to a second member that extends outward from the joint.

9. The method of claim 8, wherein the at least two members within each joint that contact each other during the predicted transformation to restrict degree of curvature of the joint are cylindrical discs.

10. The method of claim 8, wherein the at least two members within each joint that contact each other during the predicted transformation to restrict degree of curvature of the joint are rectangular.

11. The method of claim 8, wherein the joint is a means for folding.

12. The method of claim 1, wherein the first additive manufacturing material is more hydrophilic than the second additive manufacturing material.

13. The method of claim 12, wherein the first polymerizable formulation comprises one or more of hydrophilic acrylic monomers and oligomers.

14. The method of claim 13, wherein the first polymerizable formulation comprises hydroxyethyl acrylate or poly(ethylene) glycol.

15. The method of claim 1, wherein the second polymerizable formulation comprises one or more of hydrophobic acrylic monomers and oligomers.

16. The method of claim 15, wherein the second polymerizable formulation comprises monomers of one or more of phenoxy ethyl acrylate, trimethylol propane triacrylate, and isobornyl acrylate.

17. The method of claim 1, wherein one or more of the first and second polymerizable formulations further comprises one or more of a photoinitiator, surface active agent, stabilizer, and inhibitor.

18. The method of claim 1, further comprising exposing the object to an external stimulus selected from the group consisting of a solvent, temperature change, electromagnetic energy, and pressure change.

19. The method of claim 18, wherein the external stimulus is a polar solvent.

20. The method of claim 19, wherein the polar solvent is selected from the group consisting of water, an alcohol, and combinations thereof.

21. The method of claim 20, wherein the polar solvent is water.

22. The method of claim 18, wherein exposing the object to an external stimulus causes folding.

23. The method of claim 1, wherein one of the members that extends outward from the first joint is also one of the members that extends outward from the second joint.

* * * * *